United States Patent
Hansen

(10) Patent No.: US 9,002,979 B2
(45) Date of Patent: Apr. 7, 2015

(54) SPORTS TIMING SYSTEM (STS) EVENT AND PARTICIPANT ANNOUNCEMENT COMMUNICATION SYSTEM (EPACS) AND METHOD

(75) Inventor: Kurt S Hansen, Chesterfield, MO (US)

(73) Assignee: Innovative Timing Systems, LLC, St. Louis, MO (US)

(*) Notice: Subject to any disclaimer, the term of this patent is extended or adjusted under 35 U.S.C. 154(b) by 0 days.

(21) Appl. No.: 13/521,664

(22) PCT Filed: Jan. 11, 2011

(86) PCT No.: PCT/US2011/020905
§ 371 (c)(1),
(2), (4) Date: Jul. 11, 2012

(87) PCT Pub. No.: WO2011/085409
PCT Pub. Date: Jul. 14, 2011

(65) Prior Publication Data
US 2012/0324045 A1 Dec. 20, 2012

Related U.S. Application Data

(60) Provisional application No. 61/294,027, filed on Jan. 11, 2010, provisional application No. 61/369,013, filed on Jul. 29, 2010.

(51) Int. Cl.
*G06F 15/16* (2006.01)
*G04G 21/04* (2013.01)
(Continued)

(52) U.S. Cl.
CPC ............ *G04G 21/04* (2013.01); *A63B 24/0021* (2013.01); *A63B 71/0616* (2013.01);
(Continued)

(58) Field of Classification Search
CPC ............. G07C 1/24; G07C 1/22; G06F 13/00
See application file for complete search history.

(56) References Cited

U.S. PATENT DOCUMENTS

| | | |
|---|---|---|
| 4,142,680 A | 3/1979 | Oswald et al. |
| 5,091,895 A | 2/1992 | Chatwin et al. |

(Continued)

FOREIGN PATENT DOCUMENTS

| | | |
|---|---|---|
| EP | 2009595 A | 12/2008 |
| JP | 2008-276353 A | 11/2006 |

(Continued)

OTHER PUBLICATIONS

Akyildiz, Ian Fuat, Tommaso Melodia, and Kaushik R. Chowdury. "Wireless multimedia sensor networks: A survey." Wireless Communications, IEEE 14.6 (2007): 32-39.*

(Continued)

*Primary Examiner* — Chris Parry
*Assistant Examiner* — Caroline Jahnige
(74) *Attorney, Agent, or Firm* — Polster Lieder

(57) ABSTRACT

Systems and methods for communicating real-time sporting event and participant announcement information received from a sport timing system (STS). The system comprising an announcement interface system having a processor, a memory, a first data interface communicating over the a stateless packet data communication network with the sport timing system, and a second interface communicating with an announcement system. The first data interface receives a multicast datagram ANNC message including an identification of the sport timing system and participant data including a participant identifier for uniquely identifying each participant in the sporting event and participant timing data. The announcement interface system formats the received portion of the participant data into an announcement system message and transmitting the announcement system message including the participant data, the participant identifier and participant timing data.

24 Claims, 10 Drawing Sheets

(51) Int. Cl.
*A63B 24/00* (2006.01)
*A63B 71/06* (2006.01)
*G06Q 50/22* (2012.01)
*G07C 1/22* (2006.01)
*H04Q 5/22* (2006.01)

(52) U.S. Cl.
CPC *G06Q50/22* (2013.01); *G07C 1/22* (2013.01); *A63B 2220/62* (2013.01); *A63B 2225/15* (2013.01); *A63B 2225/20* (2013.01); *A63B 2225/50* (2013.01); *A63B 2225/54* (2013.01)

(56) References Cited

U.S. PATENT DOCUMENTS

| | | | |
|---|---|---|---|
| 5,140,307 | A | 8/1992 | Rebetez et al. |
| 5,436,611 | A | 7/1995 | Arlinghaus, Jr. |
| 5,493,805 | A | 2/1996 | Penuela et al. |
| 5,511,045 | A | 4/1996 | Sasaki et al. |
| 5,604,485 | A | 2/1997 | Lauro et al. |
| 5,696,481 | A | 12/1997 | Pejas et al. |
| 5,812,049 | A | 9/1998 | Uzi |
| 5,821,902 | A | 10/1998 | Keen |
| 5,883,582 | A | 3/1999 | Bowers et al. |
| 5,973,598 | A | 10/1999 | Beigel |
| 6,008,773 | A | 12/1999 | Matsuoka et al. |
| 6,100,804 | A | 8/2000 | Brady et al. |
| 6,204,813 | B1 | 3/2001 | Wadell et al. |
| 6,278,413 | B1 | 8/2001 | Hugh et al. |
| 6,340,932 | B1 | 1/2002 | Rodgers et al. |
| 6,369,697 | B1 | 4/2002 | Poole |
| 6,466,178 | B1 | 10/2002 | Muterspaugh |
| 6,496,806 | B1 | 12/2002 | Horwitz et al. |
| 6,512,478 | B1 | 1/2003 | Chien |
| 6,570,487 | B1 | 5/2003 | Steeves |
| 6,577,238 | B1 | 6/2003 | Whitesmith et al. |
| 6,696,954 | B2 | 2/2004 | Chung |
| 6,703,935 | B1 | 3/2004 | Chung et al. |
| 6,704,576 | B1 * | 3/2004 | Brachman et al. ............ 455/503 |
| 6,710,713 | B1 | 3/2004 | Russo |
| 6,720,930 | B2 | 4/2004 | Johnson et al. |
| 6,812,824 | B1 | 11/2004 | Goldinger et al. |
| 6,839,027 | B2 | 1/2005 | Krumm et al. |
| 6,888,459 | B2 | 5/2005 | Stilp |
| 6,888,502 | B2 | 5/2005 | Beigel et al. |
| 6,952,157 | B1 | 10/2005 | Stewart et al. |
| 6,963,270 | B1 | 11/2005 | Gallagher, III et al. |
| 6,985,875 | B1 * | 1/2006 | Wolf ......................... 705/26.62 |
| 6,989,750 | B2 | 1/2006 | Shanks et al. |
| 6,995,655 | B2 | 2/2006 | Ertin et al. |
| 7,009,562 | B2 | 3/2006 | Jenabi |
| 7,019,639 | B2 | 3/2006 | Stilp |
| 7,057,511 | B2 | 6/2006 | Shanks et al. |
| 7,057,975 | B2 | 6/2006 | Stobbe |
| 7,508,739 | B2 | 3/2009 | Paes |
| 7,589,616 | B2 | 9/2009 | Klatsmanyi et al. |
| 7,605,685 | B2 | 10/2009 | Stewart et al. |
| 7,605,689 | B2 | 10/2009 | Hein et al. |
| 8,085,136 | B2 | 12/2011 | Stewart et al. |
| 8,179,233 | B2 | 5/2012 | Kia |
| 2001/0040895 | A1 * | 11/2001 | Templin ........................ 370/466 |
| 2002/0008624 | A1 | 1/2002 | Paek |
| 2002/0044057 | A1 | 4/2002 | Zirbes |
| 2002/0044096 | A1 | 4/2002 | Chung |
| 2003/0073518 | A1 | 4/2003 | Marty et al. |
| 2003/0163287 | A1 | 8/2003 | Vock et al. |
| 2003/0189484 | A1 | 10/2003 | Rust et al. |
| 2003/0206549 | A1 | 11/2003 | Mody et al. |
| 2004/0006445 | A1 | 1/2004 | Paek |
| 2005/0099269 | A1 | 5/2005 | Diorio et al. |
| 2005/0120378 | A1 * | 6/2005 | Jalonen ........................... 725/97 |
| 2006/0097847 | A1 | 5/2006 | Bervoets et al. |
| 2006/0097874 | A1 | 5/2006 | Salesky et al. |
| 2006/0103536 | A1 | 5/2006 | Kwak et al. |
| 2006/0176216 | A1 | 8/2006 | Hipskind |
| 2007/0076528 | A1 | 4/2007 | Kirby |
| 2007/0097969 | A1 * | 5/2007 | Regnier ........................ 370/390 |
| 2007/0150570 | A1 * | 6/2007 | Eastham ........................ 709/223 |
| 2007/0182567 | A1 * | 8/2007 | Stewart et al. ............. 340/572.8 |
| 2007/0252770 | A1 | 11/2007 | Kai et al. |
| 2007/0262871 | A1 | 11/2007 | Yamagajo et al. |
| 2007/0272011 | A1 | 11/2007 | Chapa, Jr. et al. |
| 2008/0018479 | A1 | 1/2008 | Hashimoto et al. |
| 2008/0021676 | A1 | 1/2008 | Vock et al. |
| 2008/0111695 | A1 | 5/2008 | Yamagajo et al. |
| 2008/0143620 | A1 | 6/2008 | Khatri |
| 2008/0246615 | A1 | 10/2008 | Duron et al. |
| 2008/0246616 | A1 | 10/2008 | Sakama et al. |
| 2008/0284654 | A1 | 11/2008 | Burnside et al. |
| 2008/0316032 | A1 | 12/2008 | Kia |
| 2009/0015377 | A1 | 1/2009 | Fogg et al. |
| 2009/0141138 | A1 | 6/2009 | De Angelis |
| 2009/0184806 | A1 | 7/2009 | Kia |
| 2009/0231198 | A1 | 9/2009 | Walsh et al. |
| 2010/0019897 | A1 | 1/2010 | Stewart et al. |
| 2010/0051701 | A1 | 3/2010 | Ogata et al. |
| 2010/0088023 | A1 | 4/2010 | Werner |
| 2010/0153827 | A1 * | 6/2010 | Koster et al. .................. 714/799 |
| 2010/0158315 | A1 * | 6/2010 | Martin ........................ 382/103 |
| 2010/0295943 | A1 | 11/2010 | Cha et al. |
| 2010/0302910 | A1 | 12/2010 | Howell |
| 2011/0038369 | A1 * | 2/2011 | Lee et al. ..................... 370/389 |
| 2012/0115557 | A1 | 5/2012 | Kia |
| 2012/0230240 | A1 * | 9/2012 | Nebat et al. ................... 370/312 |

FOREIGN PATENT DOCUMENTS

| | | |
|---|---|---|
| JP | 4394600 A | 10/2009 |
| JP | 2010-088886 A | 4/2010 |
| KR | 10-2006-0078335 A | 7/2006 |
| KR | 10-2007-0092982 A | 9/2007 |
| KR | 10-2008-0090269 A | 10/2008 |
| KR | 10-2010-0100500 A | 9/2010 |

OTHER PUBLICATIONS

EP Search Report, EP 11732337.8, Sep. 23, 2014.
PCT Search Report, PCT US 2010-022559, Jan. 29, 2010.
PCT Search Report, PCT US 2011-026717, Mar. 1, 2011.
Electronic Product Code (EPC) Tag Data Standards Version 1.1 Rev. 1.24; EPC Global, Inc. Apr. 1, 2004.
Integration of RFID and Cellular Technologies, UCLA, WINMEC 2004; Karali, Sep. 2004.
Alien Debuts Gen 2 Interrogator, RFID Journal; O'Connor, Aug. 4, 2005.
Antenna Design for UHF RFID Tags: A Review and a Practical Application, IEEE Transactions on Antennas and Propagation, vol. 53, No. 12; Rao and Nikitin, Dec. 2005.
Electronic Product Code (EPC) Radio-Frequency Indentity Protocols Class-1 Generation-2 UHF FRID Protocol for Communications at 860 MHz-960 Mhz, Version 1.0.9; EPC Global, Inc., Jan. 2005.
Electronic Product Code (EPC) Generation 1 Tag Data Standards Version 1.1 Rev.1.27; EPC Global, Inc., May 10, 2005.
UHF Gen 2 System Overview, TI-RFID; Texas Instruments, Mar. 2005.
Trolleyponder/Ecotag RFID Newsletter, No. 51; Trolley Scan Pty Ltd, Jan. 5, 2006.
Tests on Timing Module for Sports Timing; Trolley Scan Pty, Jun. 2004.
New for 2005—BEST Racing now uses DAG chip timing; DAG 2005.
Intermec RFID System Manual; Intermec 2005.
RFID Primer; Alien Technology, 2004.
DAG System Instructions, Version 4; Pygma Lyon (DAG), Jul. 9, 2004.
DAG System Instructions—DAG Triathlon, Version 5; Pygma Lyon (DAG) Jul. 23, 2004.
DAG System—Badgeur V2 Sport Version Datasheet; Pygma Lyon (DAG), Jul. 19, 2004.
Alien RFID Academy Training Manual; Alien Technology, Sep. 22, 2004.

(56) References Cited

OTHER PUBLICATIONS

Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2011-020901, Jan. 11, 2011.
PCT Search Report, PCT US 2011-020905, Jan. 11, 2011.
PCT Search Report, PCT US 2011-046032, Jul. 20, 2011.
PCT Search Report, PCT US 2011-050570, Sep. 6, 2011.

* cited by examiner

Message Type | Source | Custom 1 | Custom 2 | Custom N | EOM |

Definitions for each field in the Information Packet Structure

Message Type - Indicator for the type of message being sent
Source - The name or ID of the transmitting system
Custom 1...N - Variable length field containing user-defined data
EOM - Indicator placed at the end of the information packet
| - Separator used between each field of information within the packet, as well as at the end of an information packet

Fig. 4

(A) - ANNC|FROM|BIB#|NAME|AGE|GENDER|CITY|TIME|PACKET#|EOM|

(B) - REANNC|FROM|DEST|PACKET#|EOM|

(C) - NOANNC|FROM|0|0|M|0|PACKET#|EOM|

(D) - READ|FROM|TAGSERIALNUMBER|TIME|PACKET#|EOM|

(E) - READ|FROM|PARTICIPANTNAME|TIME|PACKET#|EOM|

(F) - RESEND|FROM|DESTINATION|PACKET#|EOM|

(G) - TSYNC|FROM|TIME|EOM|

(H) - LOOKUP|FROM|IDENTIFIER|PACKET#|EOM|

(I) - STARTRFID|FROM|DEST|TIME|PACKET#|EOM|

(J) - STOPRFID|FROM|DEST|TIME|PACKET#|EOM|

(K) – COMMAND|FROM|DEST|IDENTIFIER|PACKET#|EOM|

(L) – ANNCM|BIB #|MESSAGE|EOM|

(M) – TRSTART|TIME|EOM|

(N) – ANNCL|FROM|BIB#|NAME|AGE|GENDER|CITY|TOTAL LAPS|TIME|TEAM NAME|PACKET#|EOM|

(O) – RSIG|FROM|TIME|EOM|

(P) – KREFRESH|FROM|BIB#|NAME|AGE|GENDER|CITY|TIME|PACKET#|EOM|

(Q) –RQIMAGE|FROM|DEST|IDENTIFIER|COMPRESSION|PACKETSIZE|PSOCKET|PACKET #|EOM|

(R) – STIMAGE|FROM|DEST|IDENTIFIER|COMPRESSION|PACKETSIZE|PSOCKET|PACKET #|EOM|

(S) – RQIDIR|FROM|DEST|IDENTIFIER|PACKET #|EOM|

(T) – STIDIR|FROM|DEST|FILELIST|PACKET #|EOM|

(U) – RQISTREAMON|FROM|DEST|IDENTIFIER|COMPRESSION|PACKETSIZE|PSOCKET|TIMEOUT|PACKET#|EOM|

(V) – RQISTREAMOFF|FROM|DEST|IDENTIFIER|PSOCKET|PACKET #|EOM|

Fig. 5

SPORTS TIMING SYSTEM (STS) EVENT AND PARTICIPANT ANNOUNCEMENT COMMUNICATION SYSTEM (EPACS) AND METHOD

CROSS-REFERENCE TO RELATED APPLICATIONS

This application is a United States national phase under 35 USC §371 of PCT/US2011/20905, filed Jan. 11, 2011, which claims the benefit of U.S. Provisional Application No. 61/294,027, filed on Jan. 11, 2010, entitled EPACS SYSTEMS AND METHODS; and U.S. Provisional Application No. 61/369,013, filed on Jul. 29, 2010, AUTOMATED TIMING SYSTEMS AND METHODS HAVING MULTIPLE TIME EVENT RECORDERS AND AN INTEGRATED USER TIME ENTRY INTERFACE. The disclosures of the above applications are incorporated herein by reference.

FIELD

The present disclosure relates to a timing system and, more specifically, to a communication protocol system and method of sharing sports timing event and participant information with event and participant announcement and information sharing systems.

BACKGROUND

The statements in this section merely provide background information related to the present disclosure and may not constitute prior art.

When using an RFID system or similar detection technology system for timing sporting events, it often becomes necessary to share information coming from one or more systems. This information might include, but is not limited to, the following: participant/RFID tag serial number, participant/RFID tag read time, name of a participant, age of a participant, gender of a participant, name or serial number of the transmitting system, destination name or serial number of the receiving system, sequence number for the packet of information being transmitted from the transmitting to the receiving system, or the current time on a given system. As such, there is a need for providing common communications between various components and systems of one or more sports timing systems.

This disclosure related to sports timing systems and methods and addresses the need and desire to integrate an EPACS system and capability into an automated timing system.

SUMMARY

The inventor hereof has succeeded at designing an Event and Participant Announcement Communication System (EPACS) for use with a sport timing system (STS) and method is an event communication system using an integrated communication system (ICS) and method that provides real-time statistics and event participant information including advertising announcements and personal participant announcements to a plurality of computing devices, web sites, cellular phones, television displays and monitors, and other types of communication devices. The EPACS system receives and processes real-time encoded messages coming from STS timing systems using a network interface such as STS-ICS. The EPACS system (sometimes referred to as an Announcer System in some embodiments) is comprised of software processes that operate on a computing device for formatting, displaying and communicating text, images and video related to an event or an event participant. The system incorporates a bi-directional communications interface that is capable of running over numerous types of network interfaces including wired networks, wireless networks, cellular networks, satellite networks, or private networks. The EPACS system supports numerous networking protocols including, but not limited to, UDP and TCP/IP. This makes the system ideal for use in sporting events where the communications architecture may not conform to a single technology standard.

In one aspect, a system for communicating real-time sporting event and participant announcement information received from a sport timing system (STS). The system comprising an announcement interface system having a processor, a memory, a first data interface communicating over the a stateless packet data communication network with the sport timing system, and a second interface communicating with an announcement system. The first data interface receives a multicast datagram ANNC message including an identification of the sport timing system and participant data including a participant identifier for uniquely identifying each participant in the sporting event and participant timing data. The announcement interface system formats the received portion of the participant data into an announcement system message and transmitting the announcement system message including the participant data, the participant identifier and participant timing data.

In another aspect, a system for communicating real-time sporting event and participant information from a sport timing system (STS) to an announcement system includes a sport timing system (STS) having a data interface for communicating over a data communication network and a memory with executable instructions for operating the data interface to communicate and for storing an identification of the STS system, event data, and participant data. The participant data includes a participant identifier for uniquely identifying each participant and participant timing data. A processor is coupled to the memory and the data interface for executing the executable instructions for operating the data interface to transmit datagram messages over a stateless packet data communication network. The datagram messages includes a multicast announcement (ANNC) message with the STS identification and at least a portion of the participant data including the participant identifier and participant timing data.

In yet another aspect, a method for communicating real-time sporting event and participant announcement information received from a sport timing system (STS), the method including receiving, at an announcement interface system having a processor, a memory, a first data interface communicating over the a stateless packet data communication network with the sport timing system, receiving a multicast datagram ANNC message including an identification of the sport timing system and participant data including a participant identifier for uniquely identifying each participant in the sporting event and participant timing data. The method also including formatting, in the announcement interface system, the received portion of the participant data into an announcement system message having a predetermined data format. The method further including transmitting, at a second interface of the announcement interface system communicating with an announcement system, the announcement system message including the participant data, the participant identifier, and participant timing data.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 4 is an illustration of the format for the Variable Length Message Information Packet Structure according to one exemplary embodiment.

FIG. 5 is an illustration of the format for the Pre-Defined Information Message according to one exemplary embodiment.

It should be understood that throughout the drawings, corresponding reference numerals indicate like or corresponding parts and features.

DETAILED DESCRIPTION

Figure 1:
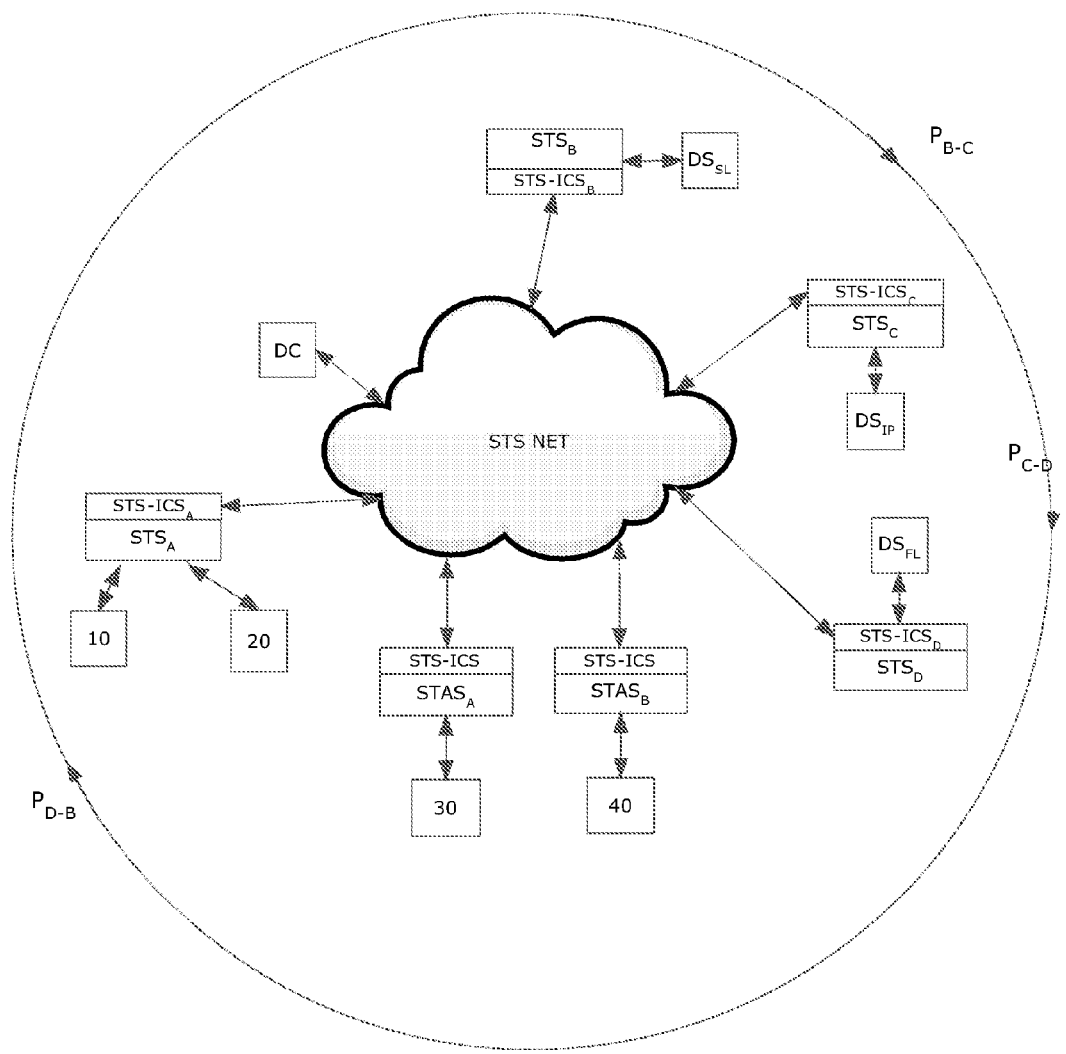
FIG. 1 is a schematic drawing showing the system architecture of the sports timing system (STS) integrated communication system (ICS), according to one exemplary embodiment.

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

The EPACS system is an event communication system that provides real-time statistics and event participant information to computing devices, web sites, cellular phones, television displays and monitors, and other types of communication devices. The capabilities of the EPACS system include, but are not limited to the following: (1) interfaces with existing STS timing systems to provide real-time updates of participant information, images and video, on television displays or monitors, (2) provides event clock screens that can show the elapsed event time updated in real-time, (3) provides real-time updates of times on participants at any point on the event course, (4) provides detailed event statistics which are updated in real-time, (5) includes event reports including, but not limited to, total finishers, total males, total females, top 5 male finishers, and top 5 female finishers, (6) provides real-time updates to web sites with event participant results, (7) includes search capabilities for locating individual or groups of participants within a event, (8) provides the ability to generate custom messages for event participants that are displayed as they cross a detection point on the course, (9) includes the ability to generate custom advertising messages that are shown on a event related display such as a event clock, and (10) provides data storage for event results which can be retrieved at any time during the event.

When using a sport timing system (STS) using an integrated communication system (ICS) for timing participants in sporting event, the EPACS system and method makes it possible to view updated participant information including, but not limited to, finish times, bib numbers, and participant names on one or more large displays. The EPACS system also displays a real-time event clock display showing elapsed event time. In addition, the EPACS system provides a real-time update screen of event results that can be used by anyone who is providing event updates over a radio or television station, or who is providing updates over a public address system at the event site. The displays supported by the EPACS system include flat-panel television screens or monitors that are placed at a finish line or in an area where participants or spectators can see the results. The information displayed on the screens not only includes participant results, it also includes custom messages for each participant, as well as advertising messages from event sponsors. Messages and screen displays can be customized by the user to utilize various font sizes, font types, colors, and the placement of information on the screens. Furthermore, the user can modify screen images to include custom artwork and logos and that information will also be displayed as event results are being updated on the television screens or monitors. The EPACS system can also update a web site with event results during the event, thus providing a communications tool for publishing event information over the internet.

The EPACS system utilizes a network to receive messages coming from an STS that may have one or more tag reader or participant detection systems associated therewith. For example, an STS-ICS communication system enables the sharing of participant and event data among systems in support of sport timing ancillary systems and applications. The EPACS system can receive messages from multiple systems. Thus, numerous detection systems can be placed at many locations on an event course and information from those systems can be transmitted over a network connection to the EPACS system. The network interface for the EPACS system can use a connected or disconnected state-less connection, thus allowing guaranteed or non-guaranteed information delivery, such as a STS-ICS network interface.

As described herein, an EPACS system utilizes a network to receive formatted text messages coming from a sport timing system. There are two primary types of messages that can be used when communicating with the EPACS system. The first type of message provides the event participant information to the EPACS system. The second type of message provides for time synchronization to make sure that the EPACS system is using the same time standard as used by the other STS and STS-ICS communicating systems at the event. The message format for the EPACS system supports variable length messages that can be customized by the user. The information can be transmitted via numerous technologies including, but not limited to, wired networks, wireless networks, satellite networks, cellular networks, serial networks, or private networks. The messages can be transmitted over any type of network communications protocol including, but not limited to, TCP/IP or UDP, or as generally defined herein by way of example as STS-ICS.

The EPACS system listens for messages on an IP address and socket number defined by the user in a configuration screen. Once this has been done, the system listens on the designated IP address and socket for inbound messages. When a message is received, it is processed by EPACS. Depending on the configuration of the EPACS system, real-time displays may be formatted and updated with participant or event information. In addition, web site updates may be completed, and reports may be updated, email messages formatted and sent, text messages formatted and sent, and images and videos transmitted and displayed by display devices.

The message type indicator at the beginning of the information packet determines the action taken by the EPACS system. Participant specific messages will contain the ANNC indictor that contains participant data/information. The end of each message or information packet should always contain an end of message delimiter, for example, as described herein an EOM "I" indicator to ensure that the end of packet can be identified by the EPACS system. In addition, the "I" character should be used to indicate the end of each field within the information packet. There are no limits on the length of a field within the information packet. Thus, the system can transmit a significant amount of event and participant information within a single message, and can include image and video links or even files.

While the EPACS system was designed for sporting events, it could be used for any number of other applications that may be associated with multiple detection systems having to work interactively together for a common purpose. Furthermore, while the EPACS system will be described in conjunction with the current embodiments, it will be understood that they are not intended to limit the EPACS system to these embodiments. On the contrary, the current design is intended to cover alternatives, modifications and equivalents, which may be included within the spirit and scope of the EPACS system.

EPACS Exemplary Embodiments

In one embodiment, a system for communicating real-time sporting event and participant information from a sport timing system (STS) to an announcement system includes a sport timing system (STS) having a data interface for communicating over a data communication network and a memory with executable instructions for operating the data interface to communicate and for storing an identification of the STS system, event data, and participant data. The participant data includes a participant identifier for uniquely identifying each participant and participant timing data. A processor is coupled to the memory and the data interface for executing the executable instructions for operating the data interface to transmit datagram messages over a stateless packet data communication network. The datagram messages includes a multicast announcement (ANNC) message with the STS identification and at least a portion of the participant data including the participant identifier and participant timing data.

In some embodiment this system also includes an announcement interface system having a processor, a memory, a first data interface communicating over the data communication network with the sport timing system, and a second interface communicating with an announcement system. The first data interface receives the transmitted ANNC message responsive to the included STS identification. The announcement interface system formats the received portion of the participant data into an announcement system message and transmits the announcement system message.

The announcement interface system includes executable instructions for formatting the announcement system message in a format selected from the group consisting of: a graphical user interface, a webpage, an SMS message, an e-mail, a video display, a url, software code, a telephone message, an image, a video, and an audio message.

The STS-ICS interfaces can include a pair mated datagram messages, a RQIMAGE requesting an image and a STIMAGE message providing the requested image, and wherein the announcement interface system formats the provided image with the announcement system message, and transmits the announcement system message including the image. In other embodiments, the STS-ICS interfaces include a pair of mated datagram messages including a RQIDIR message requesting a listing of available images and a STIDIR message providing the requested listing of available images, and wherein the announcement interface system generates the RQIMAGE message responsive to the received STIDIR message.

The STS-ICS interfaces can include a RQISTREAMON message requesting an image stream be enabled and a RQISTREAMOFF message requesting the image stream be disabled, wherein the requested image stream is received over the first data interface and wherein the announcement interface system formats the received image stream with the announcement system message, and transmits the announcement system message including the image stream.

The STS-ICS interfaces can include a broadcast datagram ANNCM message that does not include an identification of an originating STS system or an identification of an intended receiving system.

As describer herein, various datagram messages includes a uniquely assigned packet number that is a next sequential number for the data interface that can aid in the identification of the datagrams after transmission over the stateless network.

The STS-ICS interfaces can include EPACS enabling multicast messages such as ANNCL, NOANNC, TSYNC, and KREFRESH, and/or unicast messages such as REANNC, LOOKUP, COMMAND, RQIMAGE, STIMAGE, RQIDIR, STIDIR, RQISTREAMON, and RQISTREAMOFF, and/or any of the datagram broadcast messages.

In one embodiment, the broadcast messages can include an ANNCM message having the participant identifier and a text message unique to the participant identifier as described herein.

In another embodiment, a system for communicating real-time sporting event and participant announcement information received from a sport timing system (STS). The system comprising an announcement interface system having a processor, a memory, a first data interface communicating over the a stateless packet data communication network with the sport timing system, and a second interface communicating with an announcement system. The first data interface receives a multicast datagram ANNC message including an identification of the sport timing system and participant data including a participant identifier for uniquely identifying each participant in the sporting event and participant timing data. The announcement interface system formats the received portion of the participant data into an announcement system message and transmitting the announcement system message including the participant data, the participant identifier and participant timing data. The announcement format can include any suitable and desired format including: a graphical user interface, a webpage, an SMS message, an e-mail, a video display, a url, software code, a telephone message, an image, a video, and an audio message. In one embodiment, the first data interface is an STS-ICS or similar interface.

In yet another embodiment, a method for communicating real-time sporting event and participant announcement information received from a sport timing system (STS), the method including receiving, at an announcement interface system having a processor, a memory, a first data interface communicating over the a stateless packet data communication network with the sport timing system, receiving a multicast datagram ANNC message including an identification of the sport timing system and participant data including a participant identifier for uniquely identifying each participant in the sporting event and participant timing data. The method also including formatting, in the announcement interface system, the received portion of the participant data into an announcement system message having a predetermined data format. The method further including transmitting, at a second interface of the announcement interface system communicating with an announcement system, the announcement system message including the participant data, the participant identifier, and participant timing data.

The method can include transmitting over the first data interface a datagram message RQIMAGE requesting an image from the sport timing system, and receiving includes receiving a STIMAGE message with the requested image, and wherein formatting includes the received image in the announcement system message, and transmitting includes the announcement system message including the received image.

The method can also include transmitting over the first data interface a datagram message RQIDIR requesting a listing of available images from the sport timing system, wherein receiving includes a STIDIR message with the requested listing of available images, and transmitting at the announcement interface system including the RQIMAGE message responsive to the received STIDIR message.

The method can include transmitting over the first data interface a datagram message RQISTREAMON requesting an image stream over the data communication network and a RQISTREAMOFF message requesting the image stream be disabled, wherein receiving includes receiving the requested image stream over the first data interface, wherein formatting includes the provided image stream with the announcement system message, and transmitting the announcement system message with the image stream.

In some embodiments the method includes receiving at the first data interface a datagram ANNCM broadcast message including the participant identifier and a text message unique to the participant identifier, wherein formatting includes the provided image stream in the announcement system message, and transmitting the announcement system message includes the participant identifier and a text message.

As discussed above, the method can include assigning a uniquely assigned packet number that is a next sequential number to one or more datagram messages.

Of course, as known to those skilled in the art, the above described method can be implemented in nontransitory computer readable medium encoded with a set of executable instructions for enabling the first data interface and the second data interface as well as the other EPACS, STS, and STS-ICS processes as described herein.

Referring now to the drawings, FIG. 1 is a schematic drawing showing the system architecture of the sports timing system (STS) integrated communication system (ICS) suitable for use with the EPACS system, according to one exemplary embodiment.

As illustrated, and by way of example only, the system architecture includes four sports timing systems, $STS_A$-$STS_D$, and two sports timing auxiliary systems, $STAS_A$-$STAS_B$ and a distributed clock system, DC, which provides a present time signal to the sports timing systems, $STS_A$-$STS_D$. Each of the sports timing systems $STS_A$-$STS_D$ uses a corresponding integrated communication interface, $STS$-$ICS_A$-$STS$-$ICS_D$, to communicate with each other and with the sports timing auxiliary systems, $STAS_A$-$STAS_B$ over a communications network STS NET. Similarly, the sports timing auxiliary systems, $STAS_A$-$STAS_B$, use an integrated communication interface STS-ICS to communicate with each other and with the sports timing systems, $STS_A$-$STS_D$ over the communications network STS NET. Each of the sports timing systems, $STS_B$ -$STS_D$, may be paired with a corresponding detection system $DS_{SL}$, $DS_{IP}$, $DS_{FL}$. The detection systems $DS_{SL}$, $DS_{IP}$, $DS_{FL}$ are configured to read a tag worn by an event participant and to communicate one or more read times, synchronized to the distributed clock system, DC, to the corresponding sports timing system, $STS_A$-$STS_D$.

As shown, sports timing system, $STS_A$ is not paired with a detection system. Rather, sports timing system, $STS_A$ is equipped with a Graphical User Interface 10 and input system 20. Together, the Graphical User Interface 10 and input system 20 is configured to allow either manual entry by a human user or electronic entry from an outside system, and interacts with a database application for storing a plurality of participant data in the memory wherein each participant data including a participant identifier for uniquely identifying each participant, along with other participant data, without limitation, including contact information and group affiliation. Graphical User Interface 10 and input system 20 may be implemented in any suitable application programming environment, including but not limited to the Microsoft®.NET Framework.

The exemplary embodiment shown in FIG. 1 depicts two sports timing auxiliary systems, $STAS_A$-$STAS_B$ one of which is the EPACS system. Sports timing auxiliary system, $STAS_A$ is equipped with a display 30. The display may include, but is not limited to a computer monitor, message board, time clock or any other display device. Sports timing auxiliary system, $STAS_A$ is configured with suitable computer executable instructions for using the integrated communication interface STS-ICS to communicate with and EPACS system, shown here as $STAS_B$ communicating/interfacing with one or more of the announcement systems, that also communicate with the $STS_A$-$STS_D$ over the communications network STS NET using the STS-ICS protocol. In an exemplary embodiment, sports timing auxiliary system, $STAS_A$ may function as a remote controller, coordinating the communications between the other sports timing systems and sports timing auxiliary systems.

In the exemplary embodiment depicted in FIG. 1, sports timing system $STS_A$ may function as a participant check-in location, sports timing system $STS_B$ may be positioned near the starting line of the race, sports timing system $STS_C$ may be positioned at an intermediate point between the starting and finish lines, and sports timing system $STS_D$ may be positioned near the finish line of the race.

One skilled in the art will recognize that the system may be configured to include more or fewer sports timing systems and more or fewer sports timing auxiliary systems as the configuration of the race course or number of participants would dictate. Additionally, the exemplary embodiment of FIG. 1 as shown depicts a circular race course over which one or more laps may be run. One skilled in the art will recognize that any course configuration may be supported by providing an appropriate number of sports timing systems, STS's, and two sports timing auxiliary systems, STAS's such as the EPACS system arranged in a manner suitable to cover the entire course.

During operation of the system, a participant P, wearing a tag suitable for detection by each of the detection systems $DS_{SL}$, $DS_{IP}$, $DS_{FL}$ would begin near sports timing system $STS_B$, travelling along the path $P_{B-C}$. As the participant nears $STS_B$, detection system $DS_{SL}$ will detect the participant's unique identifier or other participant data, record participant timing data, which constitutes part of the participant data, which includes the determined time of detection of the participant in proximity to a detection point at the location of detection system $DS_{SL}$. Sports timing system $STS_B$ may then use the integrated communication system $STS-ICS_B$ to communicate the participant data to one or more of the sports timing systems, $STS_A$, $STS_C$-$STS_D$, or sports timing auxiliary systems, $STAS_A$-$STAS_B$ over the communications network STS NET. As the participant continues along the path $P_{C-D}$ through path $P_{D-B}$, sports timing systems, $STS_C$, $STS_D$, and their corresponding detection systems $DS_{IP}$, $DS_{FL}$ would perform in a similar manner just described for sports timing system, $STS_B$ and its corresponding detection systems $DS_{SL}$. In this way, the collective system is able to track the progress and timing of the event participant as they traverse the race course covering paths $P_{B-C}$, $P_{C-D}$ through path $P_{D-B}$.

Figure 2:
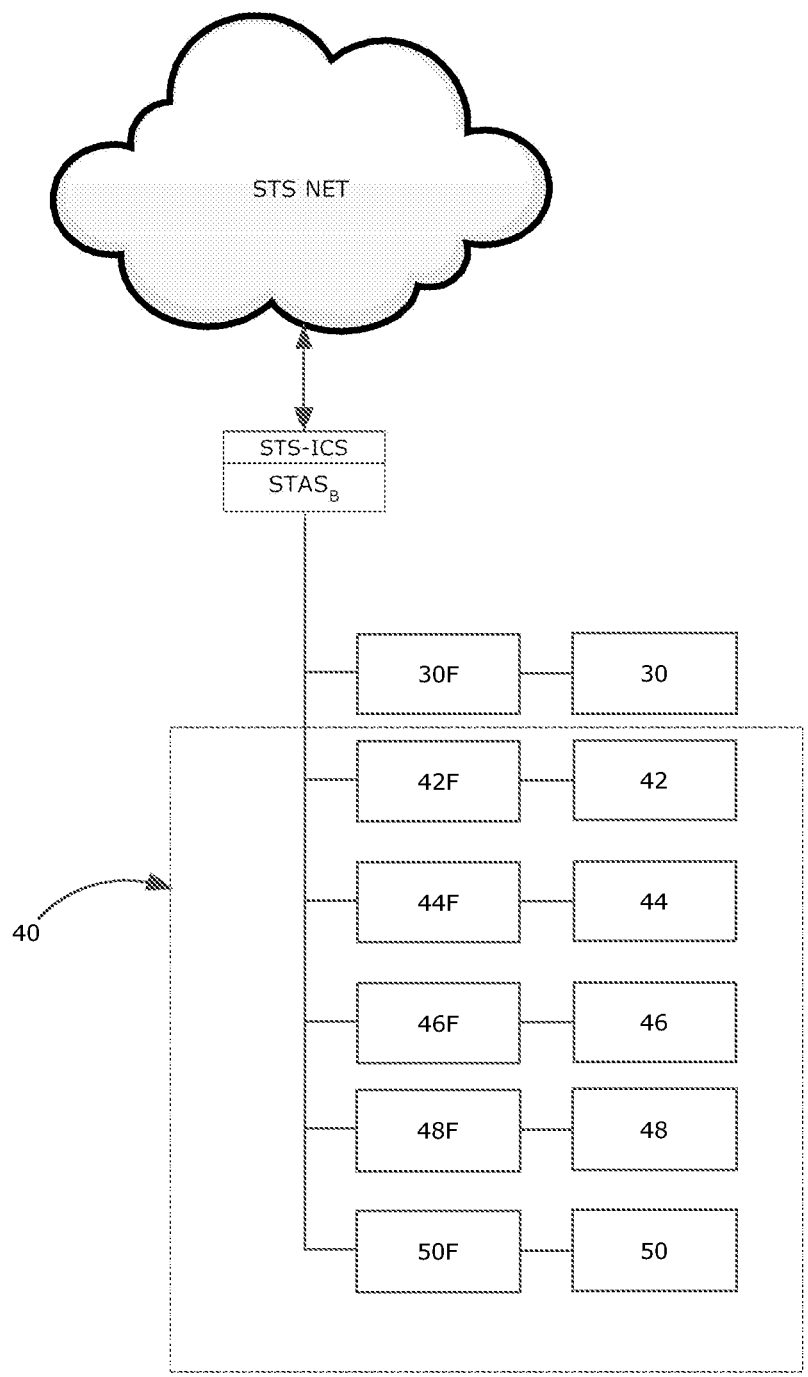
FIG. 2 is schematic drawing showing the interface between the STS-ICS and various external systems, according to one exemplary embodiment.

FIG. 2 is schematic drawing showing the interface between the STS-ICS and the EPACS system, according to one exemplary embodiment. The EPACS system $STAS_B$ utilizes the integrated communication system STS-ICS to receive participant data, including the participant's unique identifier or other associated data and participant timing data, from other sports timing systems and sports timing auxiliary systems connected to the STS NET. The EPACS system $STAS_B$ includes interface 40, which contains computer executable instructions for formatting the data received into an appropriate format as dictated by external systems 30, 42, 44, 46, 48 and 5, and transmitting the formatted participant data to external systems 30, 42, 44, 46, 48 and 50, using the corresponding formatter 30F, 42F, 44F, 46F, 48F and 50F. In an exemplary embodiment, external system 30 includes a display as described above in relation to EPACS system $STAS_A$. In an exemplary embodiment, external system 42 may represent an electronic mail system. E-mail formatter 42F may use the Simple Mail Transport Protocol (SMTP), or other suitable protocol to format electronic mail messages containing participant data to be sent by external system 42. External system 44 may represent a Short Message Service (SMS) system. SMS formatter 44F is configured to format messages containing participant data to be sent by external system 44. External system 46 may represent a particular web page interface. Web formatter 46F is configured to format messages containing participant data to be sent by external system 46, as dictated by a particular interface defined by the implementer of external system 46. Social Networking Formatter 48F is configured to format posts on social network sites 48, including without limitation Facebook® or MySpace®, in a format dictated by the implementers of social network sites 48. External system 50 can be any external system that utilizes the participant data received by EPACS system $STAS_B$. API formatter 50F is configured to send and receive predefined messages to allow external system 50 to access participant data, including the participant's unique identifier or other associated data and participant timing data, received by EPACS system $STAS_B$ over the integrated communication system STS-ICS.

The external systems, and the interfaces used to communicate with those external systems, just described are merely examples of the type of external systems that may be interfaced to the system architecture through a sports timing auxiliary system. One skilled in the art will appreciate that given an appropriate formatter, an interface to any external system could be implemented.

Figure 3:
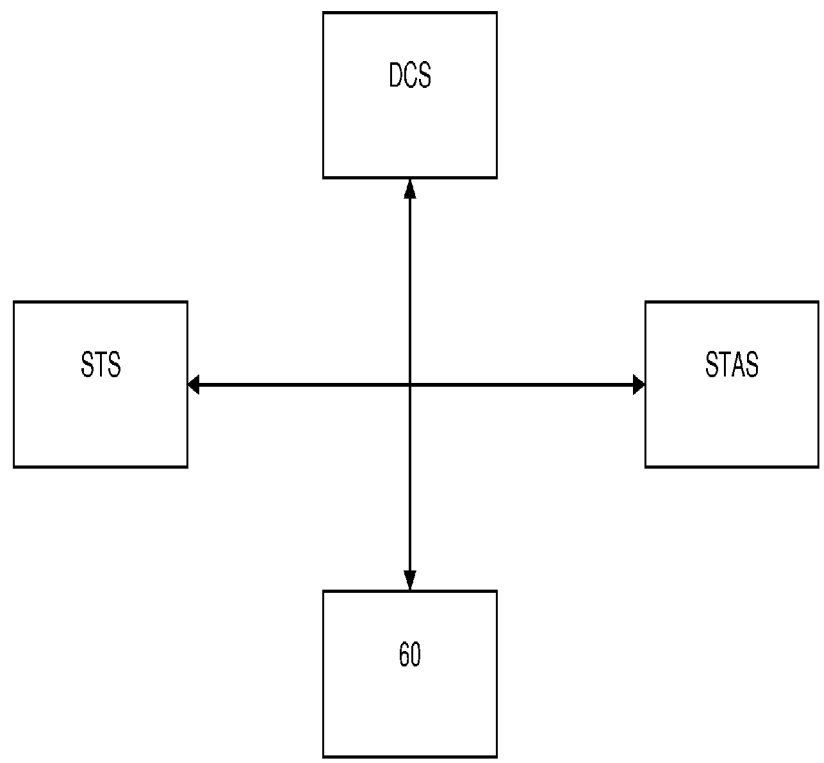
FIG. 3 is a schematic drawing showing an Example Communications Architecture configuration in which the Sports Timing Communications Systems and methods may be used to facilitate the exchange of information between different types of devices according to one exemplary embodiment.

FIG. 3 illustrates a schematic drawing of a typical communications architecture that could be used at a sporting event. The STS-ICS makes it possible for the devices shown to share race information. A system implementing the STS architecture consists of a Distributed Clock System DCS, one or more sports timing systems STS, one or more EPACS system or other auxiliary timing systems, STAS and external devices 60. The external devices 60 include external devices 30, 42, 44, 46, 48 and 50 described above, and may include other external devices without limitation, such as cellular telephones or smart phones.

FIG. 4 illustrates a variable length message information packet structure that is used to communicate event data. This packet may contain any type of information and the format of the packet includes the following: message type, source, custom field(s), and end of message indicator. Several message types are already defined, as documented below. However, the message type may contain any text which uniquely identifies a message. The system receiving the message will use the message type to determine the action required. The next field in the packet includes the source. The source is a name or unique identifier that indicates which system transmitted the message. This information is used by the receiving system to know where to send a response. The source field can include any text, but typically the IP address of a computer or device is used. The next fields within the packet are customer fields that may contain any type of information. The flexibility of the protocol makes it possible to send any type of information from one system to another. The final field that should be included in each information packet contains EOMI. This is the end of message indicator which is used by the receiving system to know when all information within a packet has been received. The packet also uses the I character to delimit each field.

Referring now to FIG. 5, there is shown the pre-defined information messages provided within the protocol. The following describes each message:

(A) Announce Message (ANNC). This message can be sent from a participant detection system, generally referred herein as an RFID system, but not limited to only RFID systems, to one or more devices on the network and the message includes information on a participant whose participant tag was read. The information within the packet includes the bib number, name, age, gender, city, and packet number. The packet number is not required and the value could be set to 0. However, if sequencing of packets is desired, for the purposes of guaranteed delivery of information, the packet number could be sent to the receiving devices. Those devices could then analyze the sequence number to verify that all packets have been received. If a particular field within the packet is not needed, a single space can be used for that field. The packet could be expanded to include additional fields as necessary.

(B) Re-announce message (REANNC). This message can be sent from a receiving device to a transmitting device to indicate that a packet was not properly received. If packet numbers are being used for the purpose of verifying that all packets are received, the re-announce message can be used to request another transmission of a packet that never arrived at the receiving device. The packet could be expanded to include additional fields as necessary.

(C) No announce message (NOANNC). This message can be sent from a device to indicate that no messages are available for a given packet number. If a device issues a re-announce message to a transmitting system, the REANNC message will include the requested packet number. If that packet number in invalid or is no longer available for re-transmission, a NOANNC message can be transmitted back to the receiver. The packet could be expanded to include additional fields as necessary.

(D) Read message (READ). This message can be sent from a system that has just read a participant tag. The message could be sent to any other device(s) and the message includes the tag serial number just read. It also includes the time of the tag read as well as an optional packet number. The READ message is the primary information packet used to communicate tag read data to all devices. The packet could be expanded to include additional fields as necessary.

(E) Read message (READ). This message can be sent from a system that has just read a participant tag. The message could be sent to any other device(s) and the message includes name of the participant that corresponds with the tag serial number just read. It also includes the time of the tag read as well as an optional packet number. The READ message is the primary information packet used to communicate tag read data to all devices. The packet could be expanded to include additional fields as necessary.

(F) Re-send message (RESEND). This message can be sent from a receiving device to a transmitting device to request another send of a particular packet. If packet numbers are being used for the purpose of verifying that all packets are received, the re-send message can be used to request another transmission of a packet that never arrived at the receiving device. The packet could be expanded to include additional fields as necessary.

(G) Time Sync (TSYNC). This message can be sent to all devices on the network to indicate the current time at the transmitting device. This message is used to synchronize the time on all devices, which is crucial for RFID systems that are used for timing sporting events.

(H) Look up (LOOKUP). This message allows a device to request race information from another device. The identifier may be any text. In most cases, the identifier will be a tag serial number, race bib number, participant name, or perhaps a unique identifier that refers to a particular type of information. For example, if a device needs to know the current duration of a race, the LOOKUP message could be sent to a time system that is tracking the total race time. The identifier field might contain the text entry "RACETIME" and this entry could be used to indicate that the race duration is desired. The packet number field is optional and if not used, the field could contain a single space.

(I) Start RFID. This message could be sent to a device to indicate that it should start performing a specific tag reader or participant detection function. If the function is to begin at a certain date or time, the TIME field could contain that information. This field could be used to initialize and start a remote participant detection system so that it begins to read tags.

(J) Stop RFID. This message could be sent to a device to indicate that it should stop performing specific participant detection or tag read function. If the function is to stop at a certain date or time, the TIME field could contain that information. This field could be used to stop a remote tag reader or participant detection system so that it no longer reads tags.

(K) Command. This message could be sent to a device to request that a particular command be executed. The IDENTIFIER field may contain any text desired. This field could be used to send any tag reader or participant detection system command to a remote device. For example, if the current battery charge level on a remote system needed to determined, a Command message could be sent with the text BATTERYSTATS in the IDENTIFIER field. The remote system would need to have functions built in that can process the command.

The STS-ICS facilitates and streamlines the communication of tag reader or participant detection system timing information between multiple computers used at sporting events. The protocol is flexible and adaptable and can be used to transmit any type of information across any type of network. The use of variable length messages makes it possible to customize the messages sent or received from any type of device. The protocol is simple and efficient and can be quickly implemented.

The foregoing descriptions of specific embodiments of the present design have been presented for the purposes of illustration and description. They are not intended to be fully exhaustive or to limit the design to the precise use, form, or methods disclosed, and it is obvious that many modifications or variations are possible in the light of the information provided above. The embodiments were chosen, shown, and described in order to best explain the concepts and principles and the practical application of the design, thus providing others skilled in the art the ability to best utilize the design and various embodiments with various modifications as are suited to the particular use desired.

Figure 6:
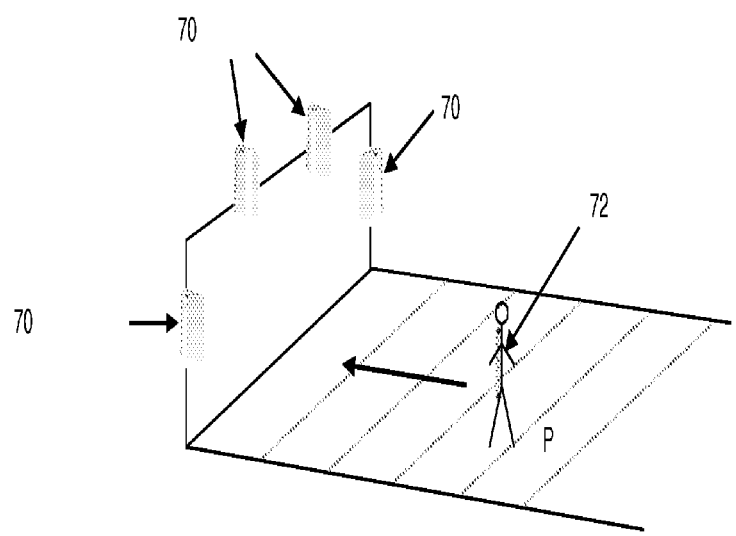
FIG. 6 is a schematic illustration of a typical STS system configuration that is used to read a Race Bib Tag as it passes antennas that are mounted overhead and on the side of a race course. The specific location of the antennas could be changed to include any position which is deemed suitable for receiving the Bib Tag signal from the tag according to one exemplary embodiment.
Figure 7:
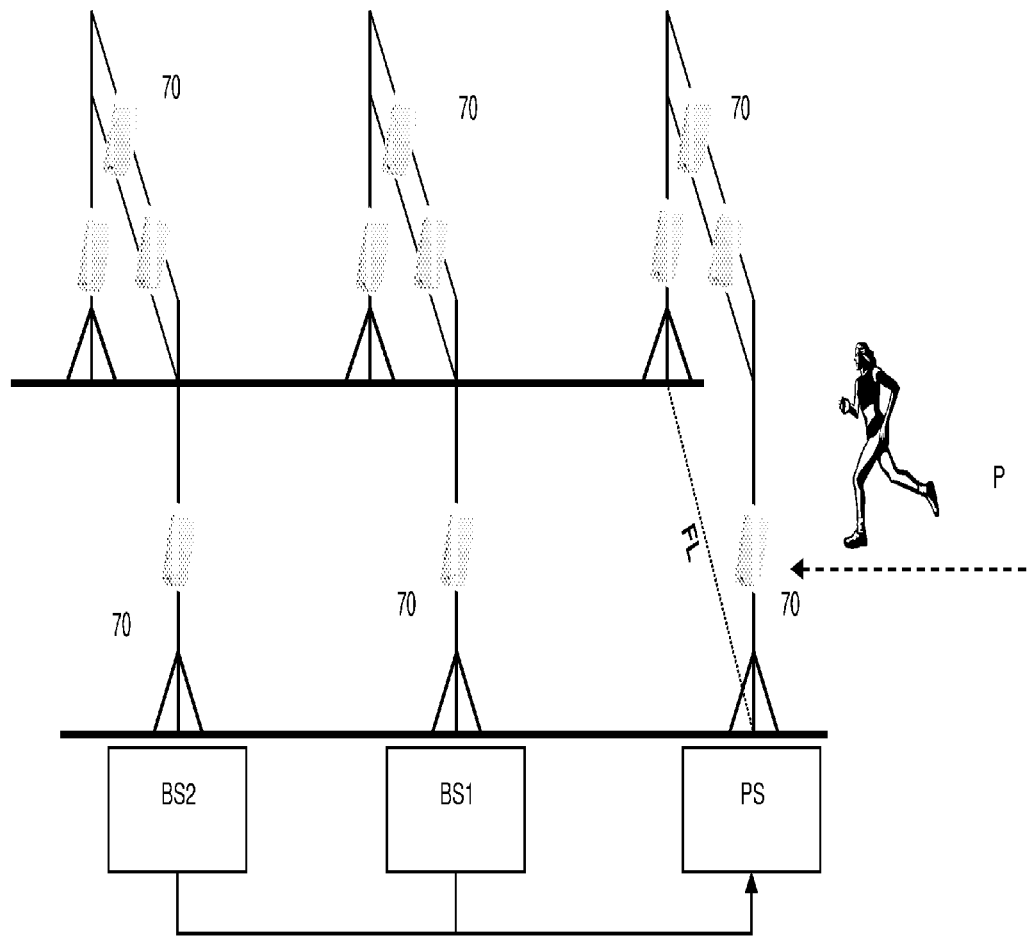
FIG. 7 is a schematic drawing showing a redundant STS Detection System network configuration according to one exemplary embodiment.

As shown in FIG. 6 a typical STS system with a detection system can be used to read a Race Bib Tag of a participant as the participant passes detection antennas that are mounted overhead and on the side of a race course. The specific location of the antennas could be changed to include any position which is deemed suitable for receiving the Bib Tag signal from the tag according to one exemplary embodiment. FIG. 7 illustrates an alternative redundant STS Detection System network configuration according to one exemplary embodiment.

Figure 8:
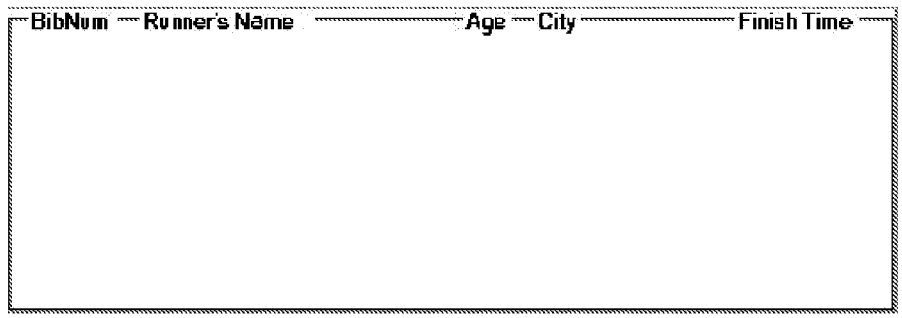
FIG. 8 is a screen shot of a graphical user interface illustrating an integrated implementation of an EPACS system application within an STS system according to one exemplary embodiment.
Figure 9:
FIG. 9 is screen shot of a graphical user interface for an IPACS system for providing input data for receiving from the STS for formatting announcement systems messages according to one exemplary embodiment
Figure 10:
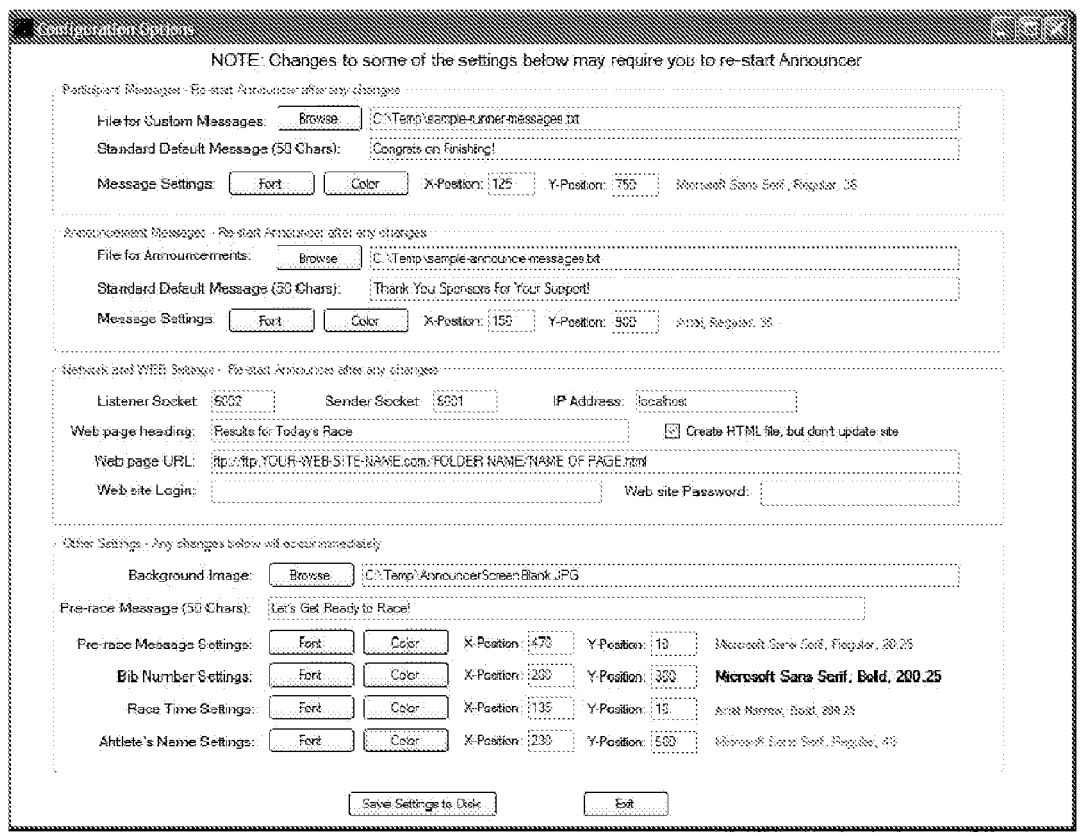
FIG. 10 is a screen shot of a graphical user interface for an IPACS system illustrating exemplary options for formatting of announcement system messages according to one exemplary embodiment

FIGS. 8-10 provide screen shots of implemented user interfaces for an exemplary EPACS system FIG. 8 is a screen shot of a graphical user interface illustrating an integrated implementation of an EPACS system application within an STS system. FIG. 9 is screen shot of a graphical user interface for an IPACS system for providing input data for receiving from the STS for formatting announcement systems messages into a desired announcement format. FIG. 10 is a screen shot of a graphical user interface for an IPACS system illustrating exemplary options for formatting of announcement system messages into any one of the desired announcement formats.

Some of the advantages of the STS-ICS include facilitating and streamlining the communication of tag reader or participant detection system timing information (such as RFID systems by way of example) between computing systems of similar or non-similar nature. For example, the protocol would permit the communication of sports timing information between desktop computers and cellular phones.

STS-ICS

The Sports Timing System (STS) Interactive Communication System and Method (STS-ICS) as described herein has both text files and network interface files.

STS-ICS can have text files that a user or STS system developer can access for creating STS-ICS compatible systems or applications.

In addition, a network interface provides an ability to communicate with an STS or STAS system such as EPACS in real-time using STS-ICS. The file interface is very quick and easy to use. The network interface is much more complex and can require experience in writing network applications. In addition, as describer herein one skilled in the art of this STS-ICS network interface and method requires an understanding of any operating systems environments in which the present STS-ICS system and method are implemented. As such, it is assumed that any person of skill in the art implementing the present STS-ICS system and method is well versed in such implementing operation system environment.

STS Files

STS-ICS can access multiple STS files that are used within one or more of the multiple STS systems including the Chip or STS Output File and the STS Database File. The file formats documented below are subject to change, so please check with us periodically for updates.

STS Output File

An STS system with a coupled participant detection system monitors a detection point and collects the identification of the detected participant and stamps a time of detection for each participant. These are referred by way of example herein as collecting participant and detection data including detection times, which can be written as participant read information to a text file. As described by way of example herein, a "chip" is a timing chip that is associated with a participant in the sporting event. A chip refers to the detection of at particular participant by a particular detection system. While a chip refers generally to an RFID chip and the reader is an RFID reader, those skilled in the art would understand that the reference to an RFID chip or chip, could be any type of tag reader or participant detection at a detection point and still be within the scope of the present disclosure.

An STS system or a user of such STS system can predetermine the name and location for the STS OUTPUT FILE. This file is updated in real-time by the STS system as the event progresses and it contains the following information: Antenna#,Bib#,Bib#,"Time" The file always uses a delimited format, shown here by example using commas as the delimiters, and the time field can be any format, but is shown in this example as having quote marks.

The exemplary format for the STS OUTPUT FILE is readable by a spreadsheet or many third party programs, but other formats are also possible. An STS system can ignore the Antenna # field for many applications as the Antenna# field is often used internally by an STS for uniquely identifying the actual equipment making the detection. The Bib # field appears twice and this is not an accident. This is repeated in this exemplary embodiment as several third-party programs require this format when importing an event timing data file. The final entry is the time of the chip read which is in the format of "HH:MM:SS" or "HH:MM:SS.XXX." As shown in this later example, the format for chip read times can be expanded to include sub-second timing. STS-ICS communication systems and methods should properly handle time values that may include tenths, hundreds, or thousandths of a second.

In the STS system, the chip number is generally the same as the bib number worn by the participant. Thus, for an event with perhaps 500 participants, the Bib # field may contain a value from 1 to 500. For larger racing events, the Bib # field can be up to 99999 or even up to 500000 or so depending on the requirements as the STS and STS-ICS systems will support these expanded field lengths.

The following is a sample of a typical STS-ICS output file using the HH:MM:SS format:
    0,41,41, "14:27:42"
    0,47,47, "14:27:44"
    0,39,39, "14:27:46"
    0,14,14, "14:27:48"
    0,32,32, "14:27:50"

Each STS is capable of detecting and reading a single chip or participant multiple times as it approaches a timing detection point. Thus, an output file may contain multiple entries for the same chip/participant. The last entry is the final read on a chip. For example, the following output file shows that a single chip was read multiple times as the runner approached the finish line in an event.
    0,32,32, "14:28:20"
    0,32,32, "14:28:21"
    0,32,32, "14:28:22"

In one exemplary embodiment, the output file only contains one entry since most runners can pass through the detection point in one second or less. However, if an event can have a number of walkers, there may easily be 4 to 5 entries for the same timing chip as the walker approaches and goes past the finish line.

As an STS system or detection system reads timing chips, the STS system appends new data to the file and continues to do so during the event. Thus, the file should not be modified or locked while an event or event is ongoing. It's best to read the file once the event is concluded, or while the system is not actively reading timing chips.

STS Database File

Each STS system coupled with a participant detection system (PDS) can have a high-speed memory with a binary database that runs in the memory and is updated very rapidly when the detection are made such as when chips are being read. When this database is saved to the disk drive, it is written to a text file using a delimited format, such as delimited using commas. When using commas as the delimiters, the file can be read by third-party programs without having to build a complex database interface as such files are common as known to those skilled in the art.

The following is a sample STS DATABASE file record:
    1,Jay_Cooper,08:00:00,08:15:00,00:00:00,00:00:00,00:00:00,08:45:00,00:45:00,50,Half Marathon,M,Allentown,Team Cooper,50001,Club Member,#76435,137

STS can have the ability to automatically write out the STS DATABASE FILE during an event to a file name selected by the STS user. For example, the STS can be specified to have a file written to the disk every 30, 45, or perhaps 60 seconds. In addition to writing the STS DATABASE FILE to the disk, STS can automatically create multiple files that have a unique file name that is based on the current date and time. By having multiple files on the disk, any of the files can be accessed without a concern about STS accessing those files again once they have been created. For example, an STS system can write the database to the disk every 60 seconds with a unique file name. The STS system can specify the base file name as STSDB.txt. When STS writes the file, it creates a file with the following name format:
    STSDB20090501100502.txt There can be multiple STS DATABASE FILES on the disk drive, and there could be hundreds of files by the time the event completes. Each of these files is essentially a unique snapshot of the event results for that moment in time.

The following is the format for the database file:
Bib#,Name,StartTime,Split1,Split2,Split3,Split4,FinishTime,ElapsedTime,Age,Division,Gender,City,TeamName,ChipField,UserField1,UserField2,UniqueID The Bib# field can contain a value from 1 to 99999 depending on the version of the STS system in use.

The Name can contain the full name and is typically formatted as FIRST NAME LAST NAME with no comma between the first and last name, but may be formatted such as using an underscore or the like. In some embodiments, it is undesirable for particular characters, such as a comma, by way of example, not be included in the name field due to their use as a delimiter where applicable. When an STS system loads the database file, it can use particular characters such as a comma to determine the individual fields. Thus, such STS database delineation characters should not be used in the Name field as such usage can cause STS to use the wrong fields for the remaining entries on the line being read.

The following fields all contain a time based on the time of day: Start Time, Split1, Split2, Split3, Split4, Finish Time. All of these fields are in the format HH:MM:SS or HH:MM:SS.XXX and there are no quote marks.

The described format for chip read times can be expanded to include sub-second timing. Any STS-ICS implementations should be implemented to properly handle time values that may include tenths, hundreds, or thousandths of a second. Following is one exemplary embodiment of a set of applicable STS data fields:

a) The Elapsed Time field is a calculated field which is typically the Finish Time minus the Start Time. This field is in the format HH:MM:SS or HH:MM:SS.XXX and there are no quote marks.

b) The Age field can contain up to 3 digits typically ranging from 1 to 100.

c) The Division field can contain a text entry that can be up to 250 characters in length, although it is typically 20 or less characters long.

d) The Gender field can contain a text entry that can be up to 250 characters in length, although it is typically 1 character with either an M or F entry.

e) The City field can contain a text entry that can be up to 250 characters in length, although it is typically 25 or less characters long.

f) The Team Name field can contain a text entry that can be up to 250 characters in length, although it is typically 25 or less characters long.

g) The Chip field can be used, in some embodiments, to include a text entry that is associated with a particular timing chip. In some embodiments the Chip field can be up to 250 characters in length, although it is expected to be 6 or less characters long.

h) The UserField1 field can contain a text entry that can be up to 250 characters in length, although it is typically 25 or less characters long. This field may be used by the software to contain values related to team order for relay events. In some cases, the STS user can place information in this field related to the STS user's personal information such as emergency contact number.

i) The UserField2 field can contain a text entry that can be up to 250 characters in length, although it is typically 25 or less characters long. This is a second field that often contains additional personal information about an event participant.

j) The UniqueID field can contain a text entry that can be up to 250 characters in length, although it is typically 10 or less characters long. This field is often used to track event-day registration numbers or other unique values that identify an event participant. STS can automatically insert a unique value in this field during the rapid registration process in the software.

Not only can STS write this STS DATABASE FILE text file to the disk drive, it can read it back in from the STS DATABASE FILE. Thus, a STS DATABASE FILE can be created using this format and STS can read it just fine. Any time fields that are created should be in the HH:MM:SS or HH:MM:SS.XXX format with leading zeros on any times that are less than 10. For example, if the time is 9:10am, the field should contain the entry 09:10:00 or 09:10:00:000. In most cases, when creating a new file that can be loaded into STS, the time fields should contain 00:00:00 or 00:00:00:000. However, if an event has assigned start times, the start times can be loaded into STS by using the StartTime field.

STS-ICS Network Interface

STS can have a state-less network interface such as provided by a user data protocol (UDP) system as used for outbound and inbound messaging over a suitable communication network. The STS-ICS system utilizes these messages to include outbound packets using STS-ICS for READ and ANNOUNCE information, as well as other data as described herein. In addition, an STS using STS-ICS monitors the Internet connection for UDP STS-ICS messages from other STS-ICS systems or third-party programs coupled to the same communication network. This interface allows third-party programs to be developed which can work within the STS architecture.

UDP packets as used by the present STS-ICS system provide a very quick and relatively easy system to implement and from which to build flexible and robust applications. While there are known limitations for UDP packets, the describes application of the UDP packets in the STS-ICS recognizes these limitations and adjusts the design and applications accordingly whereby UDP provides a very suitable solution for communicating between multiple STS systems as well as sport timing auxiliary systems (STAS) in which auxiliary applications can provide vertical applications utilizing the information available within the STS-ICS system and methods.

The following includes the packet structure for all STS-ICS supported UDP packets. STS-ICS can be configured to listen and send on any socket ranging from 5000 to 9999. In addition, STS-ICS can be set to send to a specific computer by using either the computer name or its IP address. Furthermore, STS-ICS can send to all computers on the network by using 0.255 as the last bytes in the IP address. Of course in other systems and embodiments other broadcast messaging address can also be used and still be within the scope of the present invention. In this example, if the STS-ICS is set to 192.168.1.255, the STS-ICS sends messages as Broadcast packets. STS-ICS message are sent as clear text contained within the UDP packet, with fields separated by the "|" characters. |EOM| should always come at the end of each message.

As noted, the STS-ICS network interface is configured for stateless broadcast communications systems, such as UDP using a broadcasting IP address indicator such as 255. The networking interface can however support a variety of different types of messages. These can include broadcast messages, multicast messages and unicast messages, between and among various STS-ICS systems.

Broadcast STS-ICS messages are transmitted from the STS-ICS interface over the stateless broadcast communication network with no addressing as to the intended recipient as well as no identification the STS-ICS system that is sending or sent the message. As such, each of the Broadcast STS-ICS Messages can be read by any listening STS-ICS device, and once received by that device, the receiving STS system does not know which other STS system sent the message. As will be discussed, these include, by way of example, the ANNCM and TRSTART messages.

Multicast STS-ICS messages are transmitted from the STS-ICS interface over the stateless broadcast communication network with no addressing as to the intended recipient. However, these messages include an identification of the sending STS system, e.g., FROM identifier. These STS-ICS multicast messages can be read by any STS-ICS system and once received by that STS system, the receiving STS system knows which of the other communicating STS systems the message originated. These include, by way of example, the ANNC, ANNCL, READ, NOANNC, TSYNC, RSIG, and KREFRESH messages.

Unicast STS-ICS messages are transmitted from the STS-ICS interface over the stateless broadcast communication network with an identification of which the sending entity is (FROM identifier) as well as an identification of the intended receiving STS system (DEST or Destination identifier). These unicast STS-ICS messages are essentially point to point messaging within a stateless broadcast messaging communication system. Only the identified destination STS-ICS system should receive these messages and they are ignored by all other listening STS system. The receiving STS system knows that the message was intended for its use and it knows the identification of the sending STS. These include, by way of example, the REANNC, RESEND, LOOKUP, STARTRFID, STOPRFID, COMMAND, RQIMAGE, STIMAGE, RQIDIR, STIDIR, RQISTREAMON, and RQISTREAMOFF messages by way of example.

It should be understood to those skilled in the art that other broadcast, multicast and/or unicast messages can also be developed as an application may require or benefit from the present disclosure, and still be considered within the scope of the present disclosure.

Announce Message (ANNC): The ANNC packet is sent by STS-ICS to the network and can be captured by any device that is listening on the network for UDP packets. The message indicates that STS can have read a chip at the location indicated in the From field.
Packet length=variable size
Total fields=10
ANNC|FROM|BIB#|NAME|AGE|GENDER|CITY|TIME|PACKET#|E OM|

The information in this STS-ICS packet comes from the STS internal database. The packet # is a unique 3 digit value that begins with 1 and continues to 999, after which it wraps around and starts over at 1. This packet # can be used to ensure that all messages are received. If a message is missing, a request can be made to resent that packet. STS-ICS maintains a circular buffer of past messages for this purpose.

Announce Message for Lap Events (ANNCL): The ANNCL packet is sent by STS-ICS to the network and can be captured by any device that is listening on the network for UDP packets. The message indicates that STS can have read a chip at the location indicated in the From field.
Packet length=variable size
Total fields=11
ANNCL|FROM|BIB#|NAME|AGE|GENDER|CITY|TOTAL LAPS|TIME|TEAM NAME|PACKET#|EOM|

The information in this STS-ICS packet comes from the STS internal database. The packet # is a unique 3 digit value that begins with 1 and continues to 999, after which it wraps around and starts over at 1. This packet # can be used to ensure that all messages are received. If a message is missing, a resend of the packet can be requested. STS-ICS maintains a circular buffer of past messages for this purpose.

Re-Announce Message (REANNC): The REANNC packet can be sent by STS-ICS to request a re-send of a particular packet.
Packet length=variable size
Total fields=5
REANNC|FROM|DEST|PACKET#|EOM|

When this STS-ICS message is used, the packet number should be included as desired from the STS or STS-ICS buffer. The FROM and DEST fields contain the IP addresses for the two systems.

No Announce Information (NOANNC): The NOANNC packet is sent via the STS-ICS when a request was made for a packet that is not yet available. For example, if STS-ICS can only send 100 packets, and a system requests packet number 120, the system will generate the NOANNC message in response.
Packet length=variable size
Total fields=10
NOANNC|FROM|0| |0|M| |00:00:00|Packet #|EOM|

The message returns the requested packet number with the NOANNC header.

Announce Message Information (ANNCM): The ANNCM packet is sent by STS-ICS or the Kiosk when a new message is received by an input such as is entered by a participant or family member requesting a specific participant's data be displayed on a Kiosk or an Announcer screen.
Packet length=variable size
Total fields=4
ANNCM|B|B #|MESSAGE|EOM|

Read Message (READ): The READ packet is sent by STS-ICS to the network and can be captured by any device that is listening on the network for UDP packets. The packet is a real-time feed of any reads that are occurring at the particular STS timing system.
Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested.

Additionally a separate READ message can be used that includes the PARTICIPANTNAME field in lieu of the BIB#.

Resend Message (RESEND): The RESEND message is sent to any STS system requesting that it re-send a past message. If a message is lost over the network, a request to resend can be made for any of the last 999 messages sent previously. STS-ICS maintains a buffer with the past 999 messages. Once the 999 position is used, STS-ICS starts over at position 1. Thus, STS-ICS is maintaining a circular buffer of messages.
Packet length=variable size
Total fields=5
RESEND|FROM|DEST|PACKET #|EOM|

The Destination field is the STS system that should respond to this request. This is the same name set in the STS Defaults for "My Name" in the networking section. If a request is made for a packet number that has not yet been used by STS-ICS, a packet response starting with the BLANK field can be received.

Time Sync Message (TSYNC): The TSYNC message is sent using STS-ICS to any STS system that is listening for Time Sync commands. This is typically used by STS Remote to make sure the time on the Remote laptop is the same as that on the STS system. There can always be a slight delay in the network transmission, and as such a 0.25 to 0.5 second delay may be added to the time received using STS-ICS to compensate for the delay.

Packet length=variable size
Total fields=4
TSYNC|FROM|TIME|EOM|

The FROM field is the name set in the STS Defaults as My Name.

Time Start Message (TRSTART): The TRSTART message is sent using STS-ICS to the Kiosk to set the start clock for the event. The start time can be set on a Kiosk using a command in the Configuration screen. However, by sending this packet to the Kiosk, the time can be set remotely from a STS system.

Packet length=variable size
Total fields=4
TSTART/TIME/EOM

Remote Signal Message (RSIG): The RSIG message is sent using STS-ICS to any system that is listening for RSIG command. This is typically used by STS Remote to make sure the connection over the network is good to STS-ICS and also to verify that STS-ICS is scanning and listening for remote entries.

Packet length=variable size
Total fields=4
RSIG|FROM|TIME|EOM|

The FROM field is the name set in the STS Defaults as My Name.

Refresh KIOSK Message (KREFRESH): The KREFRESH message is sent using STS-ICS to any system (typically a Kiosk) that is listening for the KREFRESH command. This is typically used by STS-ICS to send out all of the results in an event to the Kiosk. This might be useful if the Kiosk re-booted or if the Kiosk was started after results had already occurred in a event Packet length=variable size
Total fields=10
KREFRESH|FROM|BIB#|NAME|AGE|GENDER|CITY|TIME|PACK ET#|EOM|

The information in this STS-ICS packet comes from the STS internal database. The packet # is a unique 3 digit value that begins with 1 and continues to 999, after which it wraps around and starts over at 1. This packet # can be used to ensure that all messages are received. If a message is missing, a request that packet be re-sent can be made. STS-ICS maintains a circular buffer of past messages for this purpose.

Lookup Message (LOOKUP): The LOOKUP message allows a device to request event information from another device. The identifier may be any text. In most cases, the identifier will be a tag serial number, event bib number, participant name, or perhaps a unique identifier that refers to a particular type of information. For example, if a STS systems needs to know the current duration of an event, the LOOKUP message could be sent to a STS system that is responsible for tracking the total event time. The identifier field might contain the text entry "EVENTTIME" and this entry could be used to indicate that the event duration is desired. The packet number field is optional and if not used, the field could contain a single space.

Packet length=variable size
Total fields=6
LOOKUP|FROM|DEST|IDENTIFIER|PACKET #|EOM|

Start RFID Message (StartRFID): The StartRFID message can be sent to a STS system to indicate that it should start performing a specific RFID function. If the function is to begin at a certain date or time, the TIME field could contain that information. This field could be used to initialize and start a remote RFID system so that it begins to read tags. As also, as used here this is specific to RFID readers. It should be understood to those skilled in the art, that other reader or detection systems are possible and in such embodiments, other messages can be developed or this message can be adapted for their use. Other systems could include: laser detection, video detection, etc. As such, this message could alternatively be: StartDETECTOR, or StartLASER, or StartVIDEO by ways of examples.

Packet length=variable size
Total fields=7
StartRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Stop RFID Message (StopRFID): The StopRFID message can be sent to a device to indicate that it should start performing a specific RFID function. If the function is to begin at a certain date or time, the TIME field could contain that information. This field could be used to initialize and start a remote RFID system so that it begins to read tags. Other systems could include: laser detection, video detection, etc. As such, this message could alternatively be: StopDETECTOR, or StopLASER, or StopVIDEO, by ways of examples.

Packet length=variable size
Total fields=7
StopRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Command Message (COMMAND): The COMMAND message can be sent to a STS system to request that a particular command be executed in that STS system. The IDENTIFIER field may contain any text desired. This field could be used to send any tag reader or participant or tag detector command to a remote device. For example, if the current battery charge level on a remote system needed to determined, a Command message could be sent with the text BATTERYSTATS in the IDENTIFIER field. The remote system would need to have functions built in that can process the command.

Packet length=variable size
Total fields=6
COMMAND|FROM|DEST|IDENTIFIER|PACKET #|EOM|

Request Image Message (RQIMAGE): The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a remote system where a file is located. The COMPRESSION field may be used to specify the format of the image to be sent. If higher performance across a network is desired, this field might be used to indicate that High compression is desired. The field may contain any text that is recognized by the system designated as DEST. The PACKETSIZE field should contain a value indicating the maximum packet size to send at one time. Given that most images will contain more data than is able to be sent in a single packet, this field may be used to control packet size, thus tuning the network performance. The PSOCKET field is used when it necessary or desired to have multiple packet streams being sent simultaneously from the DEST. For example, the field could contain 7000 on one packet and 7001 on a different packet to indicate that two streams are being used simultaneously.

Packet length=variable size
Total fields=9
RQIMAGE|FROM|DEST|IDENTIFIER|COMPRESSION|PACKETSIZE|PSOCKET|PACKET #|EOM|

Image Sent Message (STIMAGE): The STIMAGE message is sent from a system responding to a request for an image, e.g., RQIMAGE. The IDENTIFIER field should contain the unique descriptor for the image that was requested and may contain any text desired. Typically, this field will contain a unique number for a participant in an event. However, the IDENTIFIER could also contain a specific location on a given system where a file is located. The COMPRESSION field indicates the type of compression used on the image when it was sent. If higher performance across a network is desired, this field might be used to indicate that High compression is desired. The PACKETSIZE field should contain a value indicating the length of the portion of the image just sent. Given that most images will contain more data than is able to be sent in a single packet, this field will be used to indicate how many bytes have been sent. The PSOCKET field contains a value indicating which stream the information is being sent on. This may be used when it necessary or desired to have multiple packet streams being sent simultaneously from a system. For example, this field could be used to send individual photos to different computers on a network at the same time.

Packet length=variable size
Total fields=9
STIMAGE|FROM|DEST|IDENTIFIER|COMPRESSION|PACKETSIZE|PSOCKET|PACKET #|EOM|

Request Image Library Contents Message (RQIDIR): The RQIDIR message could be sent to a device to request that the names of all images available be provided for that system. The message is useful when interfacing with a system that contains photographs or other pictures such as logos or artwork. The IDENTIFIER field should contain a unique descriptor for the type of images desired or a filter mask for the names or locations of images. For example, the IDENTIFIER might contain the text entry *, or it might contain a qualifier such as *.JPG is the user only wants to receive a list of images that are in JPG format. Of course other qualifiers may be used for other formats.

Packet length=variable size
Total fields=6
RQIDIR|FROM|DEST|IDENTIFIER|PACKET #|EOM|

Image Library Sent Message (STIDIR): The STIDIR message can be sent to one or more systems as a response to an RQIDIR message and it includes a list of images available. The FILELIST field will contain a list of images in text format that are available. Each image name will contain a carriage return line feed indicator at the end of the name. If the list has been completely transmitted, a final indicator at the end of the list will include an entry of EOL followed by a carriage return line feed. This indicator means there are no additional packets being sent and the entire list has been provided.

Packet length=variable size
Total fields=6
STIDIR|FROM|DEST|FILELIST|PACKET #|EOM|

Request Image Message (RQISTREAMON): The RQIDTREAMON message is by a STS system to request that a particular image stream be enabled for a real-time video feed. The message is useful when interfacing with a system that contains a camera displaying live video. The IDENTIFIER field should contain a unique descriptor for the image stream desired and may contain any text desired. Typically, this field will contain a unique name for a camera or video interface. However, the IDENTIFIER could also contain a specific socket, URL, or other indicator that is a live video stream. The COMPRESSION field may be used to specify the format to be used when sending the video stream. If higher performance across a network is desired, this field might be used to indicate that High compression is desired. The field may contain any text that is recognized by the system designated as DEST. The PACKETSIZE field should contain a value indicating the maximum packet size to send at one time. Since the video stream will contain a great amount of information, the image stream can be deconstructed into small packets that are sent across the network. The PSOCKET field is used when it necessary or desired to have multiple packet streams being sent simultaneously from the DEST. For example, the field could contain 6000 on one packet and 6001 on a different packet to indicate that two streams are being used simultaneously. The TIMEOUT field can be used to indicate how long, in seconds, the stream should be kept alive. If this value is set to 0, the DEST will continue to send the stream until a RQISTREAMOFF message is received.

Packet length=variable size
Total fields=10
RQISTREAMON|FROM|DEST|IDENTIFIER|COMPRESSION|PACKETSIZE|PSOCKET|TIMEOUT|PACKET #|EOM|

Request Image Message (RQISTREAMOFF): The RQISTREAMOFF message is sent by a STS system to request that a particular image stream be disabled. The IDENTIFIER field should contain a unique descriptor for the stream to be disabled. The PSOCKET field can also be used to identify a particular socket, in the event that multiple streams are being sent at the same time.

Packet length=variable size
Total fields=7
RQISTREAMOFF|FROM|DEST|IDENTIFIER|PSOCKET|PACKET #|EOM|

In other embodiments, the packet formats can vary from that described above and herein and still be within the scope of the present disclosure. For example, some or all of the timing system database fields can be sent when most of the packets are sent. In such embodiments, this can allow applications to have all of the data contained in a record in the database.

Sts-Ics Interfacing Application Example

The following is pseudo code for creating a STS-ICS UDP client application. This is simply an example of the type of STS-ICS communication code that can be implemented using the STS-ICS system and method as described herein.

```
int main( )
{
int socketnum;
struct socketnumaddress_in server_address;
struct hostloc *host;
char packet_data[128];
host = (struct hostloc *) gethostbyname((char *)"192.168.1.255");
server_address.sin_family = AF_INET;
server_address.sin_port = htons(6002);
server_address.sin_addr = *((struct in_addr *)host->h_addr);
```

```
    bzero(&(server_address.sin_zero),8);
    while (True)
    {
    printf("Type EXIT when done.");
    gets(packet_data);
    if ((strcmp(packet_data , "EXIT") == 0))
    {
    printf("Program done.");
    exit;
    }
        sendto(socketnum, packet_data, strlen(packet_data), 0,(struct
    socketnumaddress*)&server_addr,
        sizeof(struct socketnumaddress));
        }
    }
```

EPACS Implementation

A screen for an EPACS or an EPACS enable STS can contain an EPACS window that can show event finisher information. When a user enables the EPACS Mode and include the EPACS data and information. On example is shown in FIG. 8.

When an STS or detection system reads a timing chip or detects a participant, the STS looks up the detected identification number in the database to determine the participant data such as the participant's name, age, and city. It also checks to see if a starting time exists. If a starting time exists, STS then computes the total elapsed event time and places that in the Finish Time column.

In order for the EPACS screen to accurately display the participant information, the user should make sure that the database is loaded prior to the start of the event. In addition, if the user want to see a Finish Time, the user should make sure there are start times in the database. Recall that start times can be loaded using several methods including the following:

1. A user can set the Start Time for all sporting event participants, even though the user may not have a chip time for the sporting event start. In other words, if you're just timing at the finish line, the user can still enter the sporting event start time by using the Set Start Times feature in An STS.

2. A user can have An STS send the start times to the finish line system, where the EPACS screen is in use, over the Wi-Fi or network interface. This assumes the user are using two or more STS at the event.

3. A user can save the start times from the database at the starting line system to a USB ram drive and then re-load those start times into the database at the finish line.

4. A user can manually enter the start times directly into the system at the finish line by using the database screen.

The EPACS provides the user the ability to view real-time results coming from the STS. Typically the software is used at a finish line area of an event. However, it could be used anywhere on an event course and at multiple locations. EPACS can do a number of things including the following: Display real-time results for people crossing through a detection point such as the finish line; Provide real-time results for a PA EPACS who wants to call out finishers for example; Display the event time as a digital clock on large screen displays; Allow event participants to view or look up their finish times at the back of the chute; Scroll event results in real-time on a large television display connected to a laptop computer; and Update the web site with event results every one minute, among others.

The EPACS software can be loaded on multiple laptops and it utilizes a network, typically a Wi-Fi network, at the event site. To use the software, the user can simply make sure the laptop running it is within range of the STS. Usually, this means the laptop with EPACS is within 100 feet of the STS, perhaps at the finish line. Of course, there are no distance limitations within the EPACS software. Thus, if the user have a long-distance network connection, the user can use EPACS to display real-time results coming from anywhere on the course.

When a user starts the EPACS software, the user will see the screen as shown in FIG. 9, by way of example.

Configuring an EPACS

The first step in using the EPACS software is setting some Configuration options. The user will select the Configure button on this main screen. When a user does so, the user will see the user interface screen as in FIG. 10.

The user interface as shown in FIG. 10 allows the user to completely customize most of the screen layouts, as well as the network and web settings. The user can also specify the message file that contains a custom message for each event participant as they cross the finish line. This feature can enable family members to provide the user a short message they wish to have displayed on the event clock screen. In addition, the user can specify the message file for advertising or sponsor messages that the user wishes to have displayed on the event clock screen. There are numerous other options that we will discuss below.

Participant Messages

When a participant crosses the detection point, STS will send the bib number and other information to the EPACS software. The EPACS software can then display a customized message specific to that person. The message can be up to 50 characters in length and it will be displayed on the event clock screen at the location the user specifies in the configuration screen. A user can create a message file using any text editor and the format is very simple. The user simply enter the bib number followed by a comma and then a message up to 50 characters long. Consider the following example: 50,Great Job Larry on the 5K.

If the user created a text file called Participant-Messages.txt and placed the text above into that file, the EPACS software would display the message when bib 50 is sent from STS to the EPACS system. The file can be as long as the user wishes and the bib number order doesn't matter. In other words, the user can simply create a text file with bib numbers and messages in any order. EPACS will load the file when it launches.

When the message is displayed, it will stay on the event clock screen for 3 seconds, or until another bib number is received from STS. Once it has displayed for 3 seconds, the message will be cleared.

Now, take a look at the following sample message file. This will give the user some examples of what might be entered for bibs 1 to 20.

1,Congrats on the event Bill!
2,Great Job Terry!
3,You're our Hero Annie.

As the user can see, it's very easy to define the messages. The user can ask participants when they register if they would like to see a custom message displayed.

Of course some participants may not have a custom message, or the user may simply decide not to use custom messages. In that case, the user can define a standard default message to be displayed.

Announcement Messages

The user can create custom advertising messages that will be displayed on the event clock screen at the location the user specify. These messages will appear when there are no results being updated on the screen. In other words, after 3 seconds the advertising messages will begin appearing. If a participant crosses the finish line, their information will be displayed including any custom message for that participant. The advertising messages will be placed on hold for 3 seconds and start up again once there is no participant information to display. The advertising message will be displayed for a few seconds and then the next one will be displayed. Once all of the messages have been displayed the system will start over at the first message.

Advertising messages can be up to 50 characters long and the user will create a text file that contains the messages. The format of the message line is simply a single line of text. The following is an example of what the user might have in the file.

Come into our store for 10% off after the event!
Thanks to Coffee Shop for the after event drink When the user creates the announcement message file, it should be saved in a text format without any special characters. Thus, the user might use a known word processing program to create the file as a plain text file.

Once the announcement message file has been created, the user can select the file name and it will be used the next time the user start the EPACS software.

If the user don't need multiple announcement messages and prefer to have a standard message displayed during the entire event, the user can set the Standard Default Message.

STS-STS Network and Web Settings

In order for EPACS to receive messages from the STS, the user can set the network values for the software.

Listener Socket

The Listener Socket value is the network number that EPACS will use to listen for messages. In the networking world, there are unique addresses much like a street address for the home. In order for software programs to reach another program over the network, it needs to know the address of the destination. The number of addresses in a network can be quite large, but EPACS will restrict the number range to a value from 5,000 to 9,999. This would allow the user to have up to 5,000 EPACS systems running at the same time. EPACS can be pre-set when the user sets up EPACS or implementing STS system at a predetermined value of 6002, for example, but the user can change that at any time. Again, the user can change these values to any number from 5,000 to 9,999. When the user enter the value, do not use commas as we have done in this manual. Simply enter the value, such as 6002. The value a user uses for the Listener Socket should match the value set in the STS defaults for Remote Socket. For example, if STS has a default value for Remote Socket set to 6010. The user would set the Listener Socket in EPACS to 6010.

Sender Socket

As EPACS is processing messages coming from STS, it may determine that an error has occurred in the message that was received. If this is the case, it will request that STS send the message again. To do that, it needs to know the Socket Value that STS is listening on for inbound messages. In the Defaults screen of STS, there is a value set in the Listen Socket box. That value should be typed in the Sender Socket box on this EPACS configuration screen.

The Listener and Sender socket settings for EPACS can be:
1. The Listener Socket value in EPACS should match the Remote Socket value in the STS Defaults screen.
2. The Sender Socket value in EPACS should match the Listen Socket value in the STS Defaults screen.

Once the user has confirmed these settings, the user can next make sure the IP Address is set properly for the EPACS software. We will cover that next.

IP Address

The IP Address value should be set to the IP address of the primary STS at the finish line. The user can determine that address by using the System Info option in the Help Menu of STS. EPACS needs to know this specific address so it can communicate over the network with the STS. Recall that we previously mentioned that if EPACS receives a message that is incorrect, it will request that STS re-send that message. Thus, EPACS needs to know the IP address for the computer running the STS software.

In the networking world, IP addresses are usually formatted to look something like 192.168.100.105. There are always 4 numbers ranging in value from 1 to 255 and they are separated by periods. This number is the computer's unique network address in the world!

If the user wanted to run the EPACS software on the same computer as STS, the user can enter the phrase localhost in the IP Address box. This word, localhost, is a measure to EPACS software that STS is running on the same STS computer as the EPACS. The user can also set the IP Address in the STS Defaults to localhost for this to work.

This concept of using localhost can be very helpful if the user is using a single computer for training or for doing a demonstration. However, a user should never run the STS and EPACS software on the same computer for an actual event. It could result in decreased performance for STS and cause the user to miss chip reads.

Another advanced use of the IP address has to do with Broadcasts. In the networking world, the user can tell a software program to send out a message to all computers on the same network. To do this, the user simply set the last value in the IP address to 255. The value of 255 is reserved and designated to be used for broadcast messages.

For STS-ICS, a network IP address can be set to 192.168.100.255. The last value is set to 255, so messages will be sent to any computer on the 192.168.100 network. That means that computers which are designated as 0.1 to 0.254 will receive messages sent. For example, 192.168.100.50 would receive messages. 192.168.100.165 would also receive our messages. Because these two STS systems have ending addresses that are within the range of 1 to 254, they will receive our broadcast message which is being sent with an address of 255.

If a computer had another IP address such as 192.168.120.40, it would not receive these STS-ICS messages The user sees, although the last value in the address is 40, the value just to the left of that is 120, which indicates the computer is on a different network. In summary, the first 3 values in the IP address identify the actual network location, and the $4^{th}$ value designates the computer that happens to be on that network.

A user can set the IP address in EPACS to have a $4^{th}$ value different than 255, if the user is writing his own software to communicate with EPACS.

Web Page Heading, URL, Login and Password

If a user wishes to have EPACS update the web site every one minute with the latest results, the user will need to specify the URL for the site. The user can also provide a login and password to be used for the updates. Finally, the user can also define the Page Heading the user wish to have on the HTML report that will be posted to the site.

The EPACS system can receive a command from a user to instruct EPACS to create the file but not update the site. If the user wants to create the file for other purposes, the user might provide the command and it will be generated on the local computer using the URL the user specify.

In order for web updates to occur, the user can have connectivity to the Internet or to the web hosting facility. EPACS can't update the web site if the user don't already have an internet connection for the computer running EPACS.

Other EPACS Settings

The remaining settings on screen are used to the background image for the event clock screen as well as the locations, colors, and fonts for various messages.

Background Image for Event Clock

When the user turn on the Event Clock in EPACS, the user will see a window that displays the event time, the bib number and name of each person who crossed the STS detection point, customized messages for the event participant, and advertising messages. All of this information is displayed in a window that has a background image that the user can change or customize. The background image is simply a graphics file, typically a JPG file that contains the artwork. The EPACS software came with a default image that the user can use or modify. In addition, the user can quickly create the own image file and then configure the EPACS software to use it.

Pre-event Message

When the user set the event time using the "Set Event Time" option on the main EPACS screen, the user can put a time in when the event will start. If the event has not started, the event clock screen will count down the time until the event starts.

The user can also define a message that the user wish to appear on the event clock screen until the event begins. For example, the user might want a message that says, "Our Event Begins Soon!" By setting this pre-event message, the user can have the text appear when the clock is counting down.

Exemplary EPACS Feature Description

There are numerous icons on screen that control the various features in EPACS. We will now cover them in detail.

Start EPACS: This message can start the EPACS software. This means that EPACS will begin communicating with the STS the user specified when the user configured the software.

Stop EPACS: This message can disable communications with STS. When the user exit the EPACS software, it will automatically stop the communications. Thus, the only time the user will use this option is when the user need to change the configuration settings and perhaps use EPACS to communicate with a different STS.

Participant Search: This message can enable the user to input a name or bib number to locate any participant that has been displayed in the EPACS software. If the user search by name, the user can use partial names to locate everyone with that search phrase. For example, if the user wanted to find everyone with the last name of Johnson, the user would simply type that into the text box and press the Enter key. However, if the user wanted to only find Kimberly Johnson, the user would type in the full name.

First 100 Finishers: This message can open a new window and display the first 100 finishers that have been displayed in the EPACS system.

First 100 Males: This message can open a new window and display the first 100 male finishers that have been displayed in the EPACS system.

First 100 Females: This message can open a new window and display the first 100 female finishers that have been displayed in the EPACS system.

Start WEB updates: This message can cause EPACS to generate an HTML file with the event results that have been displayed. The file is created every one minute and written to the location the user specify.

Manual Bib # Entry: This message can enable the user to enter a bib number and have it sent to the STS. The STS Remote software or MEES is normally used for the purposes of entering bib numbers in a manual entry mode. However, the user can do the same thing with EPACS. We do not suggest that the user try and do this for a large event though because the EPACS software is usually quite busy managing the results and it's not designed to be a remote entry tool. Thus, this option is provided for a periodic entry and it is not designed to be the main backup entry tool.

Clear Event Stats: This message can clear all of the entries and statistics within the EPACS system. The user would use this option only if the user wish to refresh the system as though the user are just starting it up.

Event Clock On This message can enable the rack clock window. The user should maximize the window so that it can properly display the clock time and other information. This window can be dragged unto the external video display connected to the laptop computer. To truly maximize the use of the EPACS software, setup the Windows system on that laptop so that the user are running in dual display mode. This Windows feature allows the user to have separate screens for the laptop display and the external display. This will allow the user to put the event clock window on the external display, while still showing the main EPACS screen on the laptop display.

The EPACS software can be loaded on any laptop the user choose, although there are some basic video requirements the user should follow. The event clock screen works best if the resolution of the laptop screen is a minimum of 1,024×768. If the laptop supports higher resolutions that will work even better.

Results Window On This message can enable the real-time results window. The real-time results window will display all of the finishers in bib number order on screen. The user can adjust the scroll speed as well as designate if the user wish to have all finishers or just the top 100 finishers displayed. This window can be dragged unto the external video display connected to the laptop computer.

Set Event Time: This message can enable the user to set the time that the event started. This time is used by the event clock to display the elapsed event time. Simply type in the time that the event started.

One additional feature of the event time is that it can be used as a countdown until the event starts. For example, if an event starts at 09:00:00 in the morning and it is currently 08:30:00. A time can be entered of 09:00:00 for the event time, the clock will count down to 0 and then start counting forward after the event has started. This is a nice feature because it provides the event participants with notice that the event is about to start.

Quit: This message can enable the user the user to exit the EPACS software. When the user exit, none of the statistics or results are stored, so do not select this option until the user are completely done with the event.

EPACS will keep statistics and information and display results that are received from a STS. However, the user should never consider the results displayed on EPACS to be 100% accurate. Since EPACS has to receive messages from STS, it's always possible that a message was not received by EPACS for an event participant. When networks send information, there's always a chance that a message could be distorted or lost. Thus, the user should always verify the results on the STS and not count on 100% accuracy with EPACS.

Referring to FIG. 6, there is shown a schematic of an exemplary RFID timing system being used for a sporting event. In this figure, there are RFID antennas 70 mounted both overhead and to the side of the race course that will communicate with the Enhanced RFID Race Bib Tag 72 as it passes through the structure on the body of the participant P. This system configuration is commonly referred to as a "timing point," and its purpose is to read RFID tags and to record the time the participant passes.

Referring now to FIG. 7, there is shown the schematic drawing of the design of a timing point, in this case a finish line FL incorporating two backup timing systems BS1, BS2 which are networked into the primary system PS. The network interface NI could include a wired or wireless technology.

Computer Environment

Figure 11:
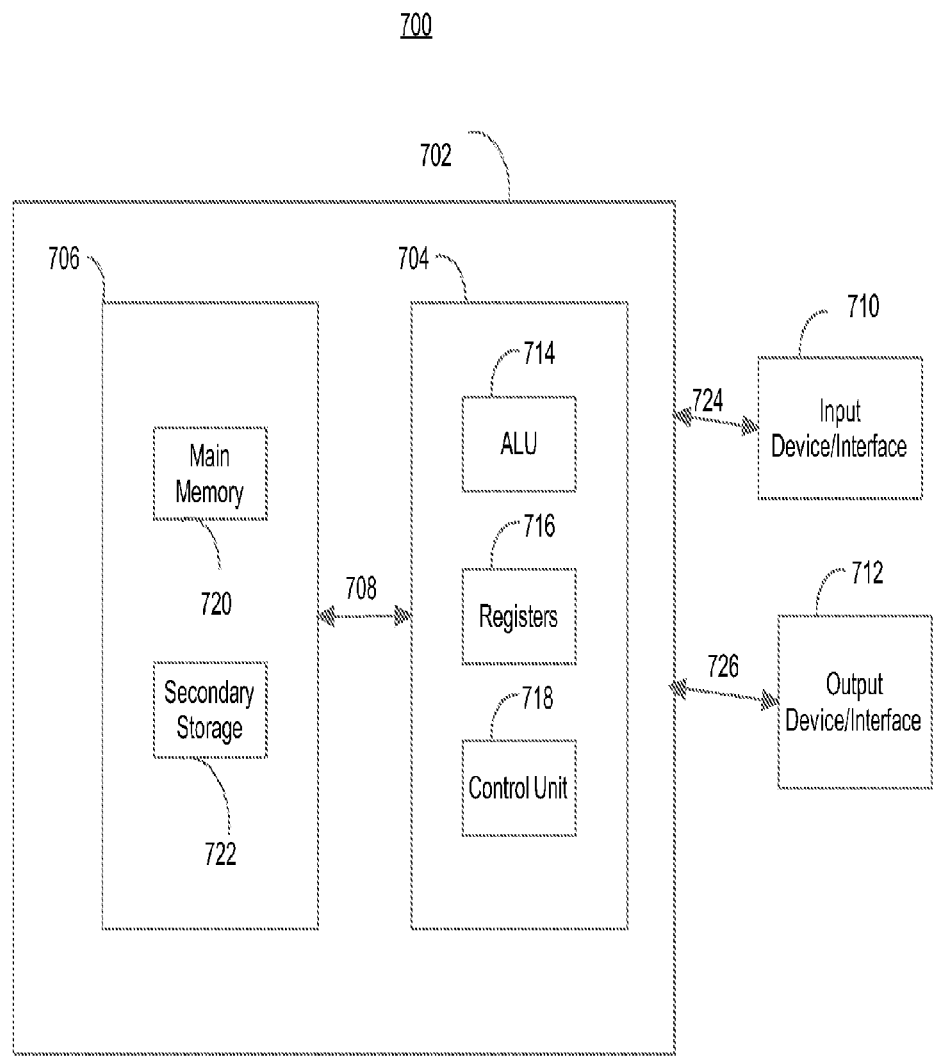
FIG. 11 is a block diagram of a computer system that may be used to implement a method and apparatus embodying the disclosures.

Referring to FIG. 11, an operating environment for an illustrated embodiment of one or more tag readers, or participant/tag detection system and supporting timing systems as described herein is a computer system 500 with a computer 502 that comprises at least one high speed central processing unit (CPU) 704, in conjunction with a memory system 506 interconnected with at least one bus structure 508, an input device 510, and an output device 512. These elements are interconnected by at least one bus structure 508. As addressed above, the input and output devices can include a communication interface including an antenna interface. Any or all of the computer components of the STS system including the STS-ICS network interface and communications systems and methods can be any computing device including, but not limited to, a lap top, PDA, Cell/mobile phone, as well as potentially a dedicated device. The software can be implemented as any "app" thereon and still be within the scope of this disclosure.

The illustrated CPU 704 for an STS-ICS, tag reader or detection system is of familiar design and includes an arithmetic logic unit (ALU) 514 for performing computations, a collection of registers for temporary storage of data and instructions, and a control unit 516 for controlling operation of the computer system 500. Any of a variety of processors, including at least those from Digital Equipment, Sun, MIPS, Motorola, NEC, Intel, Cyrix, AMD, HP, and Nexgen, is equally preferred but not limited thereto, for the CPU 504. This illustrated embodiment operates on an operating system designed to be portable to any of these processing platforms.

The memory system 506 generally includes high-speed main memory 520 in the form of a medium such as random access memory (RAM) and read only memory (ROM) semiconductor devices that are typical on a STS-ICS, tag reader or detection system. However, the present disclosure is not limited thereto and can also include secondary storage 522 in the form of long term storage mediums such as floppy disks, hard disks, tape, CD-ROM, flash memory, etc., and other devices that store data using electrical, magnetic, and optical or other recording media. The main memory 520 also can include, in some embodiments, a video display memory for displaying images through a display device (not shown). Those skilled in the art will recognize that the memory system 506 can comprise a variety of alternative components having a variety of storage capacities.

Where applicable, an input device 510, and output device 512 can also be provided in the STS-ICS, tag reader or detection system. The input device 510 can comprise any keyboard, mouse, physical transducer (e.g. a microphone), and can be interconnected to the computer 502 via an input interface 524, such as a graphical user interface, associated with or separate from the above described communication interface including the antenna interface for wireless communications. The output device 512 can include a display, a printer, a transducer (e.g. a speaker), etc, and be interconnected to the computer 502 via an output interface 526 that can include the above described communication interface including the antenna interface. Some devices, such as a network adapter or a modem, can be used as input and/or output devices.

As is familiar to those skilled in the art, the computer system 500 further includes an operating system and at least one application program. The operating system is the set of software which controls the computer system's operation and the allocation of resources. The application program is the set of software that performs a task desired by an STS user, using computer resources made available through the operating system. Both are typically resident in the illustrated memory system 306 that may be resident on the STS-ICS, tag reader or detection system.

In accordance with the practices of persons skilled in the art of computer programming, the present disclosure is described below with reference to symbolic representations of operations that are performed by the computer system 500. Such operations are sometimes referred to as being computer-executed. It will be appreciated that the operations which are symbolically represented include the manipulation by the CPU 504 of electrical signals representing data bits and the maintenance of data bits at memory locations in the memory system 506, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above in connection with the memory system 506.

When using an STS system for timing sporting events, the EPACS system makes it possible to view updated participant information including, but not limited to, finish times, bib numbers, and participant names on one or more large displays. The EPACS system also displays a real-time event clock display showing elapsed event time. In addition, the EPACS system provides a real-time update screen of event results that can be used by anyone who is providing event updates over a radio or television station, or who is providing updates over a public address system at the event site. The displays supported by the EPACS system include flat-panel television screens or monitors that are placed at a finish line or in an area where participants or spectators can see the results. The information displayed on the screens not only includes participant results, it also includes custom messages for each participant, as well as advertising messages from event sponsors. Messages and screen displays can be customized by the user to utilize various font sizes, font types, colors, and the placement of information on the screens.

Furthermore, the user can modify screen images to include custom artwork and logos and that information will also be displayed as event results are being updated on the television screens or monitors. The EPACS system can also update a web site with event results during the event, thus providing a communications tool for publishing event information over the internet.

The EPACS system utilizes a network to receive messages coming from an STS timing system. The EPACS system can receive messages from multiple systems. Thus, numerous STS devices can be placed at many locations on an event course and information from those systems can be transmitted over a network connection to the EPACS system. The network interface for the EPACS system can use a connected or disconnected state-less connection, thus allowing guaranteed or non-guaranteed information delivery.

The capabilities of the EPACS system include, but are not limited to: (1) interfaces with existing STS timing systems to provide real-time updates of participant information on television displays or monitors, (2) provides event clock screens that can show the elapsed event time updated in real-time, (3) provides real-time updates of times on participants at any point on the event course, (4) provides detailed event statistics which are updated in real-time, (5) includes event reports including, but not limited to, total finishers, total males, total females, top 5 male finishers, and top 5 female finishers, (6) provides real-time updates to web sites with event participant results, (7) includes search capabilities for locating individual or groups of participants within an event, (8) provides the ability to generate custom messages for event participants that are displayed as they cross a detection point on the course, (9) includes the ability to generate custom advertising messages that are shown on the event clock display, and (10) provides data storage for event results which can be retrieved at any time during the event.

The foregoing descriptions of specific embodiments of the present design of an EPACS have been presented for the purposes of illustration and description. They are not intended to be fully exhaustive or to limit the design to the precise use, form, or methods disclosed, and it is obvious that many modifications or variations are possible in the light of the information provided above. The embodiments were chosen, shown, and described in order to best explain the concepts and principles and the practical application of the design, thus providing others skilled in the art the ability to best utilize the design and various embodiments with various modifications as are suited to the particular use desired.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

It is further to be understood that the processes or steps described herein are not to be construed as necessarily requiring their performance in the particular order discussed or illustrated. It is also to be understood that additional or alternative processes or steps may be employed.

What is claimed is:

1. A system for communicating participant specific announcement information received from a sport timing system (STS) used to track a plurality of participants in a sporting event, the sports timing system receiving a detection of a participant from among a plurality of participants including a detection time from a coupled participant detection system and determining a time of passing of the participant by a detection point and associating the determined time of passing with a participant identifier uniquely identifying the participant in the sporting event and participant timing data, the sports timing system storing the determined time of passing associated with the participant identifier as the participant timing data, the system comprising an announcement interface system having a processor, a memory, a first data interface communicating over a communication network with the sport timing system storing a plurality of participant announcements each associated with a different one of the participants as identified by a different participant identifier, a second interface communicating with an announcement system, the first data interface
receiving a multicast datagram announcement message including an identification of the sport timing system and participant data including the participant identifier and the participant timing data, wherein the first data interface includes
a transmitted datagram request directory message requesting a listing of available images associated with the participant identifier of the received participant data from the sport timing system,
a sent image directory message in response to the datagram request directory message for receiving the requested listing of available images associated with the participant identifier,
a datagram request image message requesting an image associated with the participant identifier of the received participant data from the sport timing system responsive to the received requested listing of available images of the sent image directory message, and
an image sent message in response to the datagram request image message for receiving the requested image, the announcement interface system
identifying a participant specific announcement from the plurality of stored participant announcements that is associated with the received participant identifier;
formatting the received portion of the participant data and the received image associated with the participant identifier into an announcement system message that is customized to the participant associated with the participant identifier and including the participant specific announcement and the received image; and
transmitting over the second interface to the announcement system the formatted announcement system message including the participant data, the participant identifier, the participant specific announcement, the received image and participant timing data.

2. The system of claim 1 wherein the announcement interface system includes executable instructions for formatting the announcement system message in a format selected from the group consisting of: a graphical user interface, a webpage, a short message service (SMS) text message, an e-mail, a video display, a url, software code, a telephone message, an image, a video, and an audio message, the instructions formatting being customized as a function of the received participant identifier and customized to the specific participant to include the participant specific announcement associated with the received participant identifier.

3. The system of claim 1 wherein the first data interface includes a datagram request image stream on message requesting an image stream associated with the participant identifier over the data communication network be enabled and a request image stream off message requesting the image stream be disabled, and wherein the requested image stream is received over the first data interface, and the announcement interface system formats the received image stream associated with the participant identifier with the announcement system message, and transmits the formatted announcement system message including the participant image stream.

4. The system of claim 1 wherein the first data interface includes a datagram broadcast announce message information message that does not include an identification of the sport timing system or an identification of an intended receiving system, the announce message information message including the participant identifier and wherein the participant specific message includes a text message unique to the participant identifier.

5. The system of claim 1 wherein the multicast datagram announcement message does not include an identification of an intended receiving system, the multicast datagram announcement message including the received participant identifier for participant specific announcements and further being selected from the group of messages consisting of: an announce message for lap events message, a no announcement message, and a refresh display message.

6. The system of claim 1 wherein the first data interface includes datagram messages with one or more unicast messages having the sports timing system identifier and an identification of the intended receiving system, the unicast messages including the received participant identifier for participant specific announcements being selected from the group of messages consisting of: a message re-announcement message, a request image message, a request directory message, a request an image stream on message, and a request an image stream off message.

7. The system of claim 1 wherein the first data interface includes one or more of the unicast messages including the received participant identifier for participant specific announcements selected from the group consisting of a message re-announcement message, a request image message, a request directory message, a request an image stream on message, and a request an image stream off message; and one or more unicast messages selected from the group of messages consisting of: a sent image message and a sent directory message.

8. The system of claim 1 wherein the first data interface includes datagram messages with one or more broadcast messages, each broadcast message not including an identification of an originating sport timing system or an identification of an intended receiving sport timing system, the broadcast messages including a set start clock time message.

9. The system of claim 1 wherein the participant specific announcement includes an advertisement message from an advertising third party.

10. The system of claim 1 wherein the announcement interface system includes user interface for receiving each of the plurality of participant announcements and the associated participant identifiers for storing in the memory.

11. A method for communicating participant specific announcement information received from a sport timing system (STS) used to track a plurality of participants in a sporting event, the sports timing system receiving a detection of a participant from among a plurality of participants including a detection time from a coupled participant detection system and determining a time of passing of the participant by a detection point and associating the determined time of passing with a participant identifier uniquely identifying the participant in the sporting event and participant timing data, the sports timing system storing the determined time of passing associated with the participant identifier as the participant timing data, the method comprising
  receiving, at an announcement interface system having a processor, a memory, a first data interface communicating over the a communication network with the sport timing system, a multicast datagram announcement message including an identification of the sport timing system and participant data including the participant identifier and the participant timing data;
  storing in the announcement interface system a plurality of participant announcements each associated with a different one of the participants as identified by a different participant identifier;
  identifying a participant specific announcement from the plurality of stored participant announcements that is associated with the received participant identifier;
  transmitting over the first data interface a datagram request directory message requesting a listing of available images associated with the participant identifier of the received participant data from the sport timing system,
  in response to the datagram request directory message receiving a sent image directory message with the requested listing of available images associated with the participant identifier,
  transmitting over the first data interface a datagram request image message requesting an image associated with the participant identifier from the received listing of available images, and
  in response to the datagram request image message receiving a sent image message with the requested image,
  formatting, in the announcement interface system, the received portion of the participant data and the received image associated with the participant identifier into an announcement system message having a predetermined data format that is customized to the participant associated with the participant identifier and including the received participant specific announcement; and
  transmitting, at a second interface of the announcement interface system communicating with an announcement system, the formatted announcement system message including the participant data, the participant identifier, the received participant specific announcement including the received image, and participant timing data.

12. The method of claim 11 wherein the predefined data format is selected from the group consisting of: a graphical user interface, a webpage, an SMS message, an e-mail, a video display, a url, software code, a telephone message, an image, a video, and an audio message, the instructions formatting being customized as a function of the received participant identifier and customized to the specific participant to include the participant specific announcement associated with the received participant identifier.

13. The method of claim 11, further comprising transmitting over the first data interface a datagram request image stream on message requesting an image stream associated with the participant identifier over the data communication network and a request image stream off message requesting the image stream be disabled, wherein receiving includes receiving the requested image stream associated with the participant identifier over the first data interface, wherein formatting includes the provided image stream with the announcement system message, and transmitting the formatted announcement system message with the participant image stream.

14. The method of claim 11, further receiving at the first data interface a datagram broadcast announcement message information message including the participant identifier and a text message unique to the participant identifier, wherein formatting includes the provided image stream associated with the participant identifier in the announcement system message, and transmitting the formatted announcement system message includes the participant identifier and wherein the participant specific message includes a text message.

15. The method of claim 11 wherein the multicast datagram announcement message does not include an identification of an intended receiving system, the multicast datagram announcement message including the received participant identifier for participant specific announcements and further being selected from the group of messages consisting of: an announce message for lag events message, a no announcement message, a time synchronization message, and a refresh a display message.

16. The method of claim 11 wherein the first data interface includes datagram messages with one or more unicast messages including the received participant identifier for participant specific announcements having the sports timing system identifier and an identification of the intended receiving system, the unicast messages being selected from the group of messages consisting of: a message re-announcement message, a request an image message, an image sent message, a request a directory message, an directory sent message, a request an image stream on message, and a request an image stream off message.

17. The method of claim 11 wherein the first data interface includes one or more of the unicast messages including the received participant identifier for participant specific announcements selected from the group consisting of a request announcement message, a look up information message, an execute a command message, a request an image message, a request a directory message, a request an image stream on message, and a request an image stream off message; and one or more unicast messages selected from the group consisting of a sent image message, and a sent directory image.

18. The method of claim 11 wherein the first data interface includes datagram messages with one or more broadcast messages, each broadcast message not including an identification of an originating sport timing system or an identification of an intended receiving system, the broadcast messages including a set start clock time message.

19. The method of claim 11 wherein the participant specific announcement includes an advertisement message from an advertising third party.

20. The method of claim 11 wherein in the announcement interface system the process of receiving via a user interface each of the plurality of participant announcements and the associated participant identifiers prior to the storing thereof in the memory.

21. A non-transitory computer readable medium encoded with a set of executable instructions for communicating participant specific announcement information received from a sport timing system (STS) used to track a plurality of participants in a sporting event, the sports timing system receiving a detection of a participant from among a plurality of participants including a detection time from a coupled participant detection system and determining a time of passing of the participant by a detection point and associating the determined time of passing with a participant identifier uniquely identifying the participant in the sporting event and participant timing data, the sports timing system storing the determined time of passing associated with the participant identifier as the participant timing data, the executable instructions executing the steps comprising:

receiving, at an announcement interface system having a processor, a memory, a first data interface communicating over a communication network with the sport timing system, a multicast datagram announcement message including an identification of the sport timing system and participant data including participant identifier, and the participant timing data;

storing in the announcement interface system a plurality of participant announcements each associated with a different one of the participants as identified by a different participant identifier;

identifying a participant specific announcement from the plurality of stored participant announcements that is associated with the received participant identifier;

transmitting over the first data interface a datagram request directory message requesting a listing of available images associated with the participant identifier of the received participant data from the sport timing system, in response to the datagram request directory message receiving a sent image directory message with the requested listing of available images associated with the participant identifier, transmitting over the first data interface a datagram request image message requesting an image associated with the participant identifier from the received listing of available images, and in response to the datagram request image message receiving a sent image message with the requested image, formatting, in the announcement interface system, the received portion of the participant data and the received requested image into an announcement system message having a predetermined data format that is customized to the participant associated with the participant identifier and including the received participant specific announcement; and transmitting, at a second interface of the announcement interface system communicating with an announcement system, the formatted announcement system message including the participant data, the participant identifier, the received participant specific announcement, the received requested image, and participant timing data.

22. The non-transitory computer readable medium of claim 21, wherein the executable instructions are included for performing the steps further comprising:

transmitting over the first data interface a datagram request image message requesting an image associated with the participant identifier of the received participant data from the sport timing system, and receiving includes receiving a sent image message with the requested image associated with the participant identifier, and wherein formatting includes the received image in the announcement system message, and transmitting includes the formatted announcement system message including the received participant specific image.

23. The non-transitory computer readable medium of claim 21, wherein the executable instructions are included for performing the steps further comprising:

transmitting over the first data interface a datagram request image stream on message requesting an image stream associated with the participant identifier over the data communication network and a request image stream off message requesting the image stream be disabled, wherein receiving includes receiving the requested image stream associated with the participant identifier over the first data interface, wherein formatting includes the provided image stream associated with the participant identifier with the announcement system message, and transmitting the formatted announcement system message with the participant image stream.

24. The non-transitory computer readable medium of claim 21, wherein the executable instructions are included for performing the steps further comprising:

receiving at the first data interface a datagram broadcast announcement message information message including the participant identifier and a text message unique to the participant identifier, wherein formatting includes the provided image stream associated with the participant identifier in the announcement system message, and transmitting the formatted announcement system message includes the participant identifier and a participant specific text message.

* * * * *